United States Patent
Shiomi

(10) Patent No.: US 8,963,966 B2
(45) Date of Patent: Feb. 24, 2015

(54) DISPLAY DRIVER CIRCUIT, LIQUID CRYSTAL DISPLAY DEVICE, DISPLAY DRIVING METHOD, CONTROL PROGRAM, AND COMPUTER-READABLE RECORDING MEDIUM HAVING SAME CONTROL PROGRAM RECORDED THEREIN

(75) Inventor: Makoto Shiomi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 254 days.

(21) Appl. No.: 13/393,547

(22) PCT Filed: May 12, 2010

(86) PCT No.: PCT/JP2010/058063
§ 371 (c)(1),
(2), (4) Date: Mar. 1, 2012

(87) PCT Pub. No.: WO2011/027593
PCT Pub. Date: Mar. 10, 2011

(65) Prior Publication Data
US 2012/0162290 A1    Jun. 28, 2012

(30) Foreign Application Priority Data

Sep. 4, 2009  (JP) .................................. 2009-205214

(51) Int. Cl.
*G09G 5/10* (2006.01)
*G09G 3/36* (2006.01)
(Continued)

(52) U.S. Cl.
CPC ............. *H04N 7/014* (2013.01); *G09G 3/3685* (2013.01); *H04N 7/0132* (2013.01);
(Continued)

(58) Field of Classification Search
CPC ...................................................... G06F 1/255
USPC ........................................................ 348/441
See application file for complete search history.

(56) References Cited

U.S. PATENT DOCUMENTS

2002/0158857 A1* 10/2002 Iisaka ............................ 345/204
2005/0162359 A1*  7/2005 Sugino ............................ 345/89
(Continued)

FOREIGN PATENT DOCUMENTS

JP        2005-321813 A    11/2005
JP        2006-91412 A      4/2006
(Continued)

OTHER PUBLICATIONS

International Search Report.

*Primary Examiner* — Kent Chang
*Assistant Examiner* — Mark Edwards
(74) *Attorney, Agent, or Firm* — Harness, Dickey & Pierce, P.L.C.

(57) ABSTRACT

Provided is a display driver circuit (50) which carries out frame interpolation and overshooting. An interpolation frame generation section (52) has (i) a first generation mode of generating, based on an image of a key frame corresponding to a video signal, an interpolation frame so that a position of an object is changed with passage of time and (ii) a second generation mode of generating, based on the image of the key frame, an interpolation frame so that a display gradation of the object is changed with passage of time. An overshooting section (53) causes an emphasis level in a tone transition for the interpolation frame generated according to the second generation mode to be different from that for the key frame. Thus, a configuration is proposed which can improve a moving image response characteristic in a display driver circuit which carries out frame interpolation and overshooting.

36 Claims, 22 Drawing Sheets

(51) Int. Cl.
*G06F 3/038* (2013.01)
*H04N 7/01* (2006.01)

(52) U.S. Cl.
CPC ............ *G09G 2300/0814* (2013.01); *G09G 2300/0876* (2013.01); *G09G 2320/0252* (2013.01); *G09G 2320/0261* (2013.01); *G09G 2340/0435* (2013.01); *G09G 2340/16* (2013.01); *G09G 2300/0426* (2013.01)
USPC .............................. 345/690; 345/87; 345/204

(56) References Cited

U.S. PATENT DOCUMENTS

| | | | |
|---|---|---|---|
| 2006/0055713 A1* | 3/2006 | Asao et al. | 345/690 |
| 2006/0282867 A1* | 12/2006 | Mizuhashi et al. | 725/105 |
| 2007/0057895 A1* | 3/2007 | Kong et al. | 345/98 |
| 2007/0236439 A1* | 10/2007 | Chen et al. | 345/89 |
| 2008/0007614 A1 | 1/2008 | Mizuhashi et al. | |
| 2008/0036714 A1* | 2/2008 | Imai et al. | 345/87 |
| 2008/0220246 A1* | 9/2008 | Suzuki et al. | 428/332 |
| 2008/0231745 A1* | 9/2008 | Ogino et al. | 348/441 |
| 2008/0297676 A1* | 12/2008 | Kimura | 349/39 |
| 2009/0109351 A1* | 4/2009 | Shiomi | 348/790 |
| 2009/0207163 A1* | 8/2009 | Yamato et al. | 345/214 |
| 2010/0033555 A1* | 2/2010 | Nagase et al. | 348/43 |
| 2011/0001874 A1 | 1/2011 | Ohta et al. | |

FOREIGN PATENT DOCUMENTS

| | | | |
|---|---|---|---|
| JP | 2006091412 A | * | 4/2006 |
| JP | 2006-165602 A | | 6/2006 |
| JP | 2008-236098 A | | 10/2008 |
| JP | 2009-162955 A | | 7/2009 |
| JP | 2009162955 A | * | 7/2009 |
| WO | WO-2009/107331 A1 | | 9/2009 |

\* cited by examiner

FIG. 5

| FRAME | INPUT IMAGE | FRC IMAGE | FRAME IDENTIFICATION SIGNAL | TARGET GRADATION (LUMINANCE) /CONVENTIONAL | ESTIMATED ATTAINED GRADATION (LUMINANCE) /PRESENT INVENTION | OS LEVEL |
|---|---|---|---|---|---|---|
| 0 | 0 | 0 | KEY | 0 | 0 | JUST |
| 0.25 |  | 0 | INTERPOLATION | 0 | 0 | STRONG |
| 0.5 |  | 0 | INTERPOLATION | 0 | 0 | STRONG |
| 0.75 |  | 0 | INTERPOLATION | 0 | 0 | STRONG |
| 1 | 0 | 0 | KEY | 0 | 0 | JUST |
| 1.25 |  | 0.25 | INTERPOLATION (1) | 0.25 | 0.35 | STRONG |
| 1.5 |  | 0.5 | INTERPOLATION (2) | 0.5 | 0.56 | STRONG |
| 1.75 |  | 0.75 | INTERPOLATION (3) | 0.75 | 0.826 | STRONG |
| 2 | 1 | 1 | KEY | 1 | 1 | JUST |
| 2.25 |  | 1 | INTERPOLATION | 1 | 1 | STRONG |
| 2.5 |  | 1 | INTERPOLATION | 1 | 1 | STRONG |
| 2.75 |  | 1 | INTERPOLATION | 1 | 1 | STRONG |
| 3 |  | 1 | KEY | 1 | 1 | JUST |

|  | | INPUT GRADATION (TARGET GRADATION) | | | | | | | |
|---|---|---|---|---|---|---|---|---|---|
|  |  | 0 | 32 | 64 | 96 | 128 | 160 | 192 | 224 | 255 |
| START GRADATION | 0 | 0 | 32 | 64 | 96 | 128 | 160 | 192 | 224 | 254 |
|  | 32 | 2 | 32 | 64 | 96 | 128 | 160 | 192 | 224 | 244 |
|  | 64 | 5 | 32 | 64 | 96 | 128 | 160 | 192 | 224 | 254 |
|  | 96 | 8 | 32 | 64 | 96 | 128 | 160 | 192 | 224 | 254 |
|  | 128 | 11 | 32 | 64 | 96 | 128 | 160 | 192 | 224 | 254 |
|  | 160 | 14 | 32 | 64 | 96 | 128 | 160 | 192 | 224 | 254 |
|  | 192 | 17 | 32 | 64 | 96 | 128 | 160 | 192 | 224 | 254 |
|  | 224 | 20 | 32 | 64 | 96 | 128 | 160 | 192 | 224 | 254 |
|  | 255 | 22 | 32 | 64 | 96 | 128 | 160 | 192 | 224 | 255 |

(b)

|  | | INPUT GRADATION (TARGET GRADATION) | | | | | | | |
|---|---|---|---|---|---|---|---|---|---|
|  |  | 0 | 32 | 64 | 96 | 128 | 160 | 192 | 224 | 255 |
| START GRADATION | 0 | 0 | 64 | 119 | 149 | 170 | 187 | 214 | 251 | 255 |
|  | 32 | 0 | 32 | 86 | 125 | 148 | 181 | 209 | 239 | 255 |
|  | 64 | 0 | 17 | 64 | 109 | 140 | 177 | 207 | 235 | 255 |
|  | 96 | 0 | 11 | 48 | 96 | 135 | 173 | 204 | 233 | 255 |
|  | 128 | 0 | 7 | 35 | 85 | 128 | 167 | 201 | 232 | 255 |
|  | 160 | 0 | 5 | 27 | 73 | 118 | 160 | 197 | 230 | 255 |
|  | 192 | 0 | 4 | 18 | 58 | 107 | 154 | 192 | 227 | 255 |
|  | 224 | 0 | 3 | 12 | 47 | 94 | 143 | 186 | 224 | 255 |
|  | 255 | 0 | 2 | 10 | 38 | 89 | 138 | 183 | 222 | 255 |

| | | \\\\ INPUT GRADATION \\\\ | | | | | | | | |
|---|---|---|---|---|---|---|---|---|---|---|
| | | 0 | 32 | 64 | 96 | 128 | 160 | 192 | 224 | 255 |
| START GRADATION | 0 | 0 | 37 | 74 | 111 | 149 | 186 | 223 | 255 | 255 |
| | 32 | 0 | 32 | 72 | 110 | 148 | 185 | 223 | 255 | 255 |
| | 64 | 0 | 29 | 64 | 105 | 144 | 183 | 221 | 255 | 255 |
| | 96 | 0 | 23 | 61 | 96 | 138 | 178 | 217 | 255 | 255 |
| | 128 | 0 | 0 | 58 | 94 | 128 | 170 | 211 | 250 | 255 |
| | 160 | 0 | 0 | 53 | 91 | 126 | 160 | 203 | 244 | 255 |
| | 192 | 0 | 0 | 46 | 87 | 123 | 158 | 192 | 235 | 255 |
| | 224 | 0 | 0 | 34 | 83 | 120 | 155 | 190 | 224 | 255 |
| | 255 | 0 | 0 | 4 | 77 | 117 | 153 | 188 | 222 | 255 |

(b)

| | | INPUT GRADATION | | | | | | | | | | | | | | | | | |
|---|---|---|---|---|---|---|---|---|---|---|---|---|---|---|---|---|---|---|---|
| | | 0 | | 32 | | 64 | | 96 | | 128 | | 160 | | 192 | | 224 | | 255 | |
| | | OUTPUT | ESTIMATED | OUTPUT | ESTIMATED | OUTPUT | ESTIMATED | OUTPUT | ESTIMATED | OUTPUT | ESTIMATED | OUTPUT | ESTIMATED | OUTPUT | ESTIMATED | OUTPUT | ESTIMATED | OUTPUT | ESTIMATED |
| START GRADATION | 0 | 0 | 0 | 73 | 37 | 128 | 74 | 159 | 111 | 181 | 149 | 209 | 186 | 250 | 223 | 255 | 255 | 255 | 255 |
| | 32 | 0 | 0 | 32 | 32 | 96 | 72 | 135 | 110 | 169 | 148 | 203 | 185 | 238 | 223 | 255 | 255 | 255 | 255 |
| | 64 | 0 | 0 | 15 | 29 | 64 | 64 | 118 | 105 | 159 | 144 | 199 | 183 | 232 | 221 | 255 | 255 | 255 | 255 |
| | 96 | 0 | 0 | 7 | 23 | 45 | 61 | 96 | 96 | 147 | 138 | 190 | 178 | 227 | 217 | 255 | 255 | 255 | 255 |
| | 128 | 0 | 0 | 0 | 0 | 30 | 58 | 82 | 94 | 128 | 128 | 178 | 170 | 219 | 211 | 253 | 250 | 255 | 255 |
| | 160 | 0 | 0 | 0 | 0 | 19 | 53 | 66 | 91 | 115 | 126 | 160 | 160 | 208 | 203 | 246 | 244 | 255 | 255 |
| | 192 | 0 | 0 | 0 | 0 | 10 | 46 | 47 | 87 | 99 | 123 | 151 | 158 | 192 | 192 | 237 | 235 | 255 | 255 |
| | 224 | 0 | 0 | 0 | 0 | 4 | 34 | 33 | 83 | 82 | 120 | 135 | 155 | 183 | 190 | 224 | 224 | 255 | 255 |
| | 255 | 0 | 0 | 0 | 0 | 0 | 4 | 21 | 77 | 71 | 117 | 127 | 153 | 177 | 188 | 220 | 222 | 255 | 255 |

FIG. 9

|  |  | INPUT GRADATION | | | | | | | | |
|---|---|---|---|---|---|---|---|---|---|---|
|  |  | 0 | 32 | 64 | 96 | 128 | 160 | 192 | 224 | 255 |
| START GRADATION | 0 | 0 | 37 | 74 | 111 | 149 | 186 | 223 | 254 | 254 |
|  | 32 | 2 | 32 | 72 | 110 | 148 | 185 | 223 | 254 | 254 |
|  | 64 | 5 | 29 | 64 | 105 | 144 | 183 | 221 | 254 | 254 |
|  | 96 | 8 | 23 | 61 | 96 | 138 | 178 | 217 | 254 | 254 |
|  | 128 | 11 | 11 | 58 | 94 | 128 | 170 | 211 | 250 | 254 |
|  | 160 | 14 | 14 | 53 | 91 | 126 | 160 | 203 | 244 | 254 |
|  | 192 | 17 | 17 | 46 | 87 | 123 | 158 | 192 | 235 | 254 |
|  | 224 | 20 | 20 | 34 | 83 | 120 | 155 | 190 | 224 | 254 |
|  | 255 | 22 | 22 | 22 | 77 | 117 | 153 | 188 | 222 | 255 |

FIG. 12

|  |  | INPUT GRADATION | | | | | | | | |
|---|---|---|---|---|---|---|---|---|---|---|
|  |  | 0 | 32 | 64 | 96 | 128 | 160 | 192 | 224 | 255 |
| START GRADATION | 0 | 0 | 73 | 128 | 159 | 181 | 209 | 250 | 255 | 255 |
| | 32 | 0 | 32 | 96 | 135 | 169 | 203 | 238 | 255 | 255 |
| | 64 | 0 | 15 | 64 | 118 | 159 | 199 | 232 | 255 | 255 |
| | 96 | 0 | 7 | 45 | 96 | 147 | 190 | 227 | 255 | 255 |
| | 128 | 0 | 0 | 30 | 82 | 128 | 178 | 219 | 253 | 255 |
| | 160 | 0 | 0 | 19 | 66 | 115 | 160 | 208 | 246 | 255 |
| | 192 | 0 | 0 | 10 | 47 | 99 | 151 | 192 | 237 | 255 |
| | 224 | 0 | 0 | 4 | 33 | 82 | 135 | 183 | 224 | 255 |
| | 255 | 0 | 0 | 0 | 21 | 71 | 127 | 177 | 220 | 255 |

DISPLAY DRIVER CIRCUIT, LIQUID CRYSTAL DISPLAY DEVICE, DISPLAY DRIVING METHOD, CONTROL PROGRAM, AND COMPUTER-READABLE RECORDING MEDIUM HAVING SAME CONTROL PROGRAM RECORDED THEREIN

TECHNICAL FIELD

The present invention relates to a hold-type display device such as a liquid crystal display device.

BACKGROUND ART

Hold-type display devices such as liquid crystal display devices have a problem that, in a case where a moving image is displayed, a blurred image (so-called motion blur) is observed by a viewer since there occurs a gap between a point of viewer's gaze following an object and a position of the object that is being displayed.

One example of a method for solving the motion blur problem is a method of providing a display period of a minimum luminance level (e.g., black display of 0% luminance level) in a part of 1 frame period.

However, this method has a problem that flicker is likely to occur since bright and dark states are repeated on an entire screen in each frame. Moreover, there is a problem that, in a case where a luminance level of a video signal is maximum (e.g., white display of 100% luminance level), providing a display period of a minimum luminance level within 1 frame period causes a reduction in luminance level.

In view of this, as a technique for reducing motion blur without causing flicker, a technique (so-called frame interpolation technique) is proposed in which an interpolation frame is generated and inserted within 1 frame period (Patent Literature 1 etc.).

The following describes the frame interpolation technique. FIG. 19 illustrates an image of a first frame and an image of a second frame, and illustrates a state in which a black object displayed on a left side in the first frame moves to a right side in the second frame. An interpolation frame is generated based on a motion vector calculated from a video signal of the first frame and a video signal of the second frame. For example, in a case where a frame rate of the video signal is increased 4 times (quad-speed drive), a motion vector which corresponds to a travel distance in the first frame and the second frame is divided into quarters, and three interpolation frames are generated based on the motion vectors thus obtained.

FIG. 20 illustrates a state in which the three interpolation frames are inserted within first and second frame periods. As illustrated in FIG. 20, the three interpolation frames in which the black object gradually moves to the right side with time are inserted in the first and second frame periods. This makes motion of the black object smooth, thereby reducing motion blur.

In the frame interpolation technique, a search range for a travel distance of an object (motion vector) is generally set within 200 ppf (pixels per field) in 1 frame period in consideration of power consumption and driving load. Only in a case where a motion vector is found within this range, an interpolation frame in which a position of the object is estimated based on the motion vector is generated (first generation mode).

Meanwhile, no interpolation frame corresponding to the motion vector is generated in (i) a case where the travel distance of the object exceeds the search range, (ii) a case where the travel distance of the object falls in the search range, but an object displayed in a first frame and an object displayed in a second frame are not recognized as an identical object due to a minor change in brightness and color, or (iii) a case where a video signal is not a signal of a moving image (e.g., video in which a still image displayed in a first frame is lost in a second frame). In such cases, an interpolation frame having an intermediate gradation which is obtained by distributing gradations of video signals in previous and subsequent frames according to a time component is generated (second generation mode). This is intended to preserve luminance balance and color balance as compared with a smooth motion of the object attained by the first generation mode.

As described above, in the frame interpolation technique, a range in which an interpolation frame corresponding to a motion vector can be generated (first generation mode) is limited. Accordingly, there are cases where a motion vector is not calculated even in a case where video signals are of a moving image of an identical object. In such cases, an interpolation frame having an intermediate gradation is generated (second generation mode).

FIG. 21 illustrates a state in which interpolation frames each having an intermediate gradation are inserted. As illustrated in FIG. 21, a black object displayed on a left side in a first frame gradually changes from black to white with time, and lost in a second frame. Meanwhile, no object is present on a right side of a display frame in the first frame, but color gradually changes from white to black with time, and a black object appears in the second frame. In a case where a motion vector is not calculated, interpolation frame of intermediate gradations are thus inserted.

By the way, currently, a MVA (multi domain vertical alignment mode) mode and an IPS (In-Plane Switching) mode are mainly adopted as liquid crystal modes of liquid crystal display devices from the viewpoint of contrast and viewing angle characteristic. However, a response time in these liquid crystal modes is approximately 4 msec in the fastest gradation region, approximately 8 msec in average, and as slow as 15 msec in the slowest gradation region.

Accordingly, in liquid crystal display devices driven at a frequency (120 Hz) double the video signal of 60 Hz, overshooting (tone transition emphasis process) is generally used. The overshooting allows an improvement in response speed of liquid crystals, thereby improving moving image response characteristics.

CITATION LIST

Patent Literature 1
Japanese Patent Application Publication, Tokukai, No. 2006-165602 A (Publication Date: Jun. 22, 2006)

SUMMARY OF INVENTION

Technical Problem

However, in a case where the frame interpolation technique and the overshooting are combined, there arises a problem that a response speed in a region of an intermediate gradation declines. The waveform shown by the dotted line in FIG. 22 shows a relationship between an attained gradation (luminance) and a frame (time) in the region of an intermediate gradation which relationship is obtained in a case where the frame interpolation technique (FRC) and the overshooting are combined (driven at 240 Hz). The waveform shown by the solid line in FIG. 22 shows a response characteristic of liquid crystals achieved in a case where only the overshooting is carried out (driven at 60 Hz).

As shown in FIG. 22, in a case where the frame interpolation technique is not carried out (driven at 60 Hz), an original response characteristic of liquid crystals is obtained, i.e., a waveform which inverse exponentially changes due to movement of an elastic member is obtained (the solid line in FIG. 22). Meanwhile, in a case where the frame interpolation technique and the overshooting are combined (driven at 240 Hz), an attained gradation in an interpolation frame having an intermediate gradation is set to agree with a target gradation, and therefore a waveform which linearly changes is obtained (the dotted line in FIG. 22). FIG. 22 shows a result of comparison in time taken for luminance to change from 0.2 to 0.8 (upper left portion of the graph).

As is clear from FIG. 22, in a case where the frame interpolation and the overshooting are combined (driven at 240 Hz), a response speed in a region of an intermediate gradation seemingly declines as compared with the case where the overshooting is carried out at 60 Hz drive.

In view of the above problems, the present invention proposes an arrangement which allows an improvement in response characteristic of a moving image in a display driver circuit which carries out frame interpolation and overshooting.

Solution to Problem

A display driver circuit of the present invention includes: an interpolation frame generation section for generating, on a basis of an image of a previous frame and an image of a subsequent frame, an interpolation frame to be inserted in 1 frame period; and a tone transition emphasis process section for setting an output gradation of a current frame on a basis of an input gradation of the current frame and a display gradation of the previous frame, the display driver circuit driving a liquid crystal display panel so that display corresponding to the output gradation is carried out, the interpolation frame generation section having (i) a first generation mode of generating, on a basis of an image of a key frame corresponding to a video signal, an interpolation frame so that a position of an object is changed with passage of time and (ii) a second generation mode of generating, on a basis of the image of the key frame, an interpolation frame so that a display gradation of the object is changed with section causing an emphasis level in a tone transition for the interpolation frame generated according to the second generation mode to be different from an emphasis level in a tone transition for the key frame.

According to the arrangement, an emphasis level for a tone transition of an interpolation frame having an intermediate gradation can be made different from an emphasis level for a tone transition of a key frame. For example, the emphasis level for the tone transition of the interpolation frame having the intermediate gradation can be made larger than the emphasis level for the tone transition of the key frame. This allows an output gradation of the interpolation frame having the intermediate gradation to be larger than that of a conventional arrangement. Consequently, response speed can be improved (see FIG. 6).

A liquid crystal display device of the present invention includes the display driver circuit and the liquid crystal display panel.

A display driving method of the present invention includes the steps of: (a) generating, on a basis of an image of a previous and an image of a subsequent frame, an interpolation frame to be inserted in 1 frame period; and (b) setting an output gradation of a current frame on a basis of an input gradation of the current frame and a display gradation of the previous frame, the display driving method being for driving a liquid crystal display panel so that display corresponding to the output gradation is carried out, the step (a) including (i) a first generation mode of generating, on a basis of an image of a key frame corresponding to a video signal, an interpolation frame so that a position of an object is changed with passage of time and (ii) a second generation mode of generating, on a basis of the image of the key frame, an interpolation frame so that a display gradation of the object is changed with passage of time, in the step (b), an emphasis level in a tone transition for the interpolation frame generated according to the second generation mode being made different from an emphasis level in a tone transition for the key frame.

According to the driving method, a similar effect to that produced by the arrangement of the display driver circuit can be attained. That is, an output gradation of the interpolation frame having the intermediate gradation can be made larger than that of a conventional arrangement. Consequently, response speed can be improved.

Note that the display driver circuit may be realized by a computer. In this case, the present invention encompasses (i) a control program for each device which causes the computer to function as each means so that the display driver circuit is realized by the computer and (ii) a computer-readable recording medium in which the control program is stored.

Advantageous Effects of Invention

As described above, the display driver circuit and the display driving method of the present invention is arranged such that the emphasis level for the tone transition of the interpolation frame having the intermediate gradation is made different from the emphasis level for the tone transition of the key frame. This makes it possible to improve a moving image response characteristic.

BRIEF DESCRIPTION OF DRAWINGS

FIG. 4 is a graph showing relationship between a frame (time) and transmittance for each conversion level of overshooting.

FIG. 5 is a diagram showing relationship between a frame (current frame) inputted to an overshooting section of the liquid crystal display device of FIG. 1 and an estimated attained luminance.

FIG. 7

(a) of FIG. 7 is a table showing a target gradation corresponding to a just level, and (b) of FIG. 7 is a diagram showing a first LUT (first look-up table).

FIG. 8

(a) of FIG. 8 is a table in which an estimated attained luminance is expressed by 256 gradations (strong level), and (b) of FIG. 8 is a diagram showing a second LUT (second look-up table).

FIG. 9 is a table showing an attained gradation (display gradation) attained after the overshooting (next frame).

Figure 10:
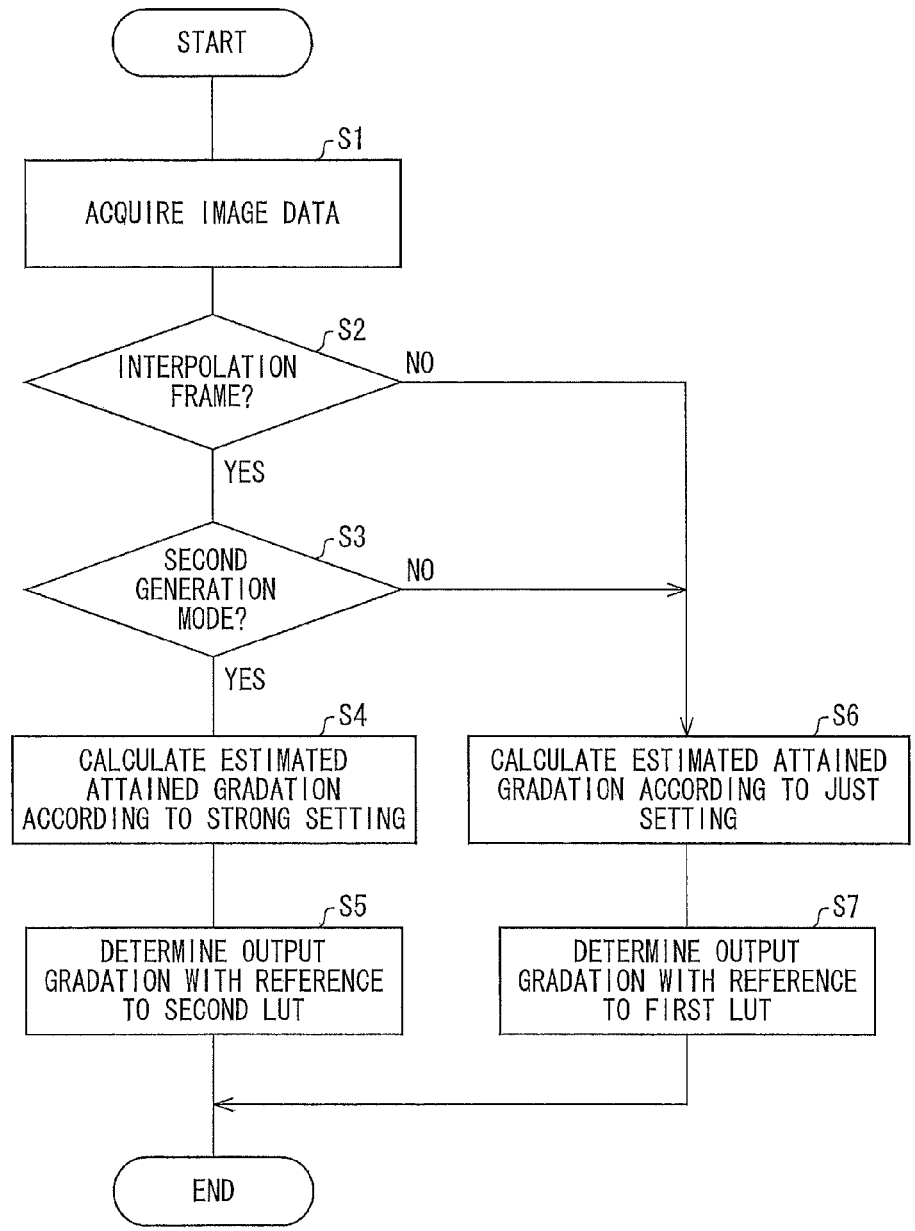

FIG. 10 is a flow chart showing an operation of the overshooting section of Embodiment 1.

Figure 11:
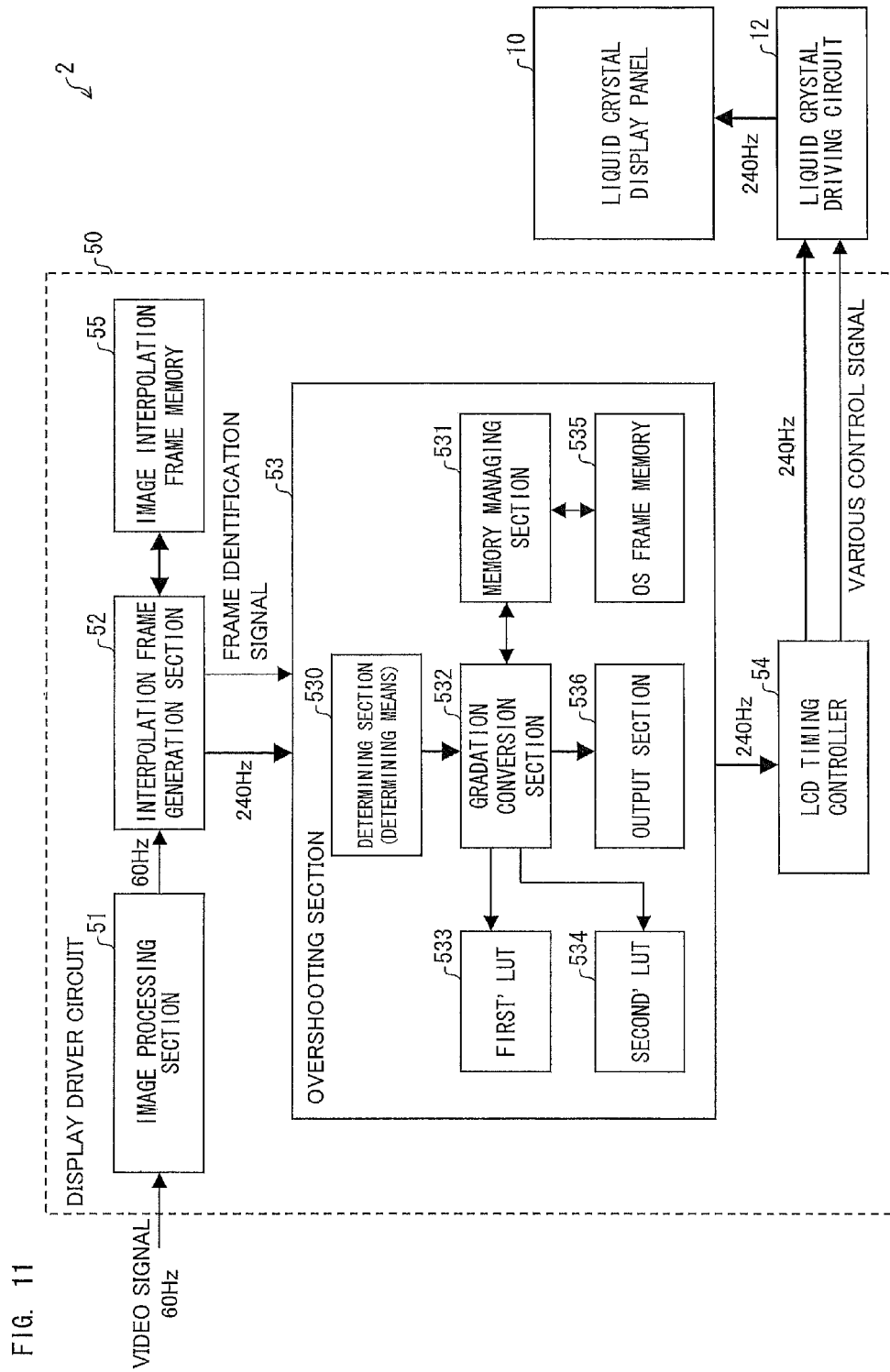

FIG. 11 is a block diagram illustrating an overall configuration of a liquid crystal display device of Embodiment 2.

FIG. 12 is a diagram showing a second' LUT.

Figure 13:
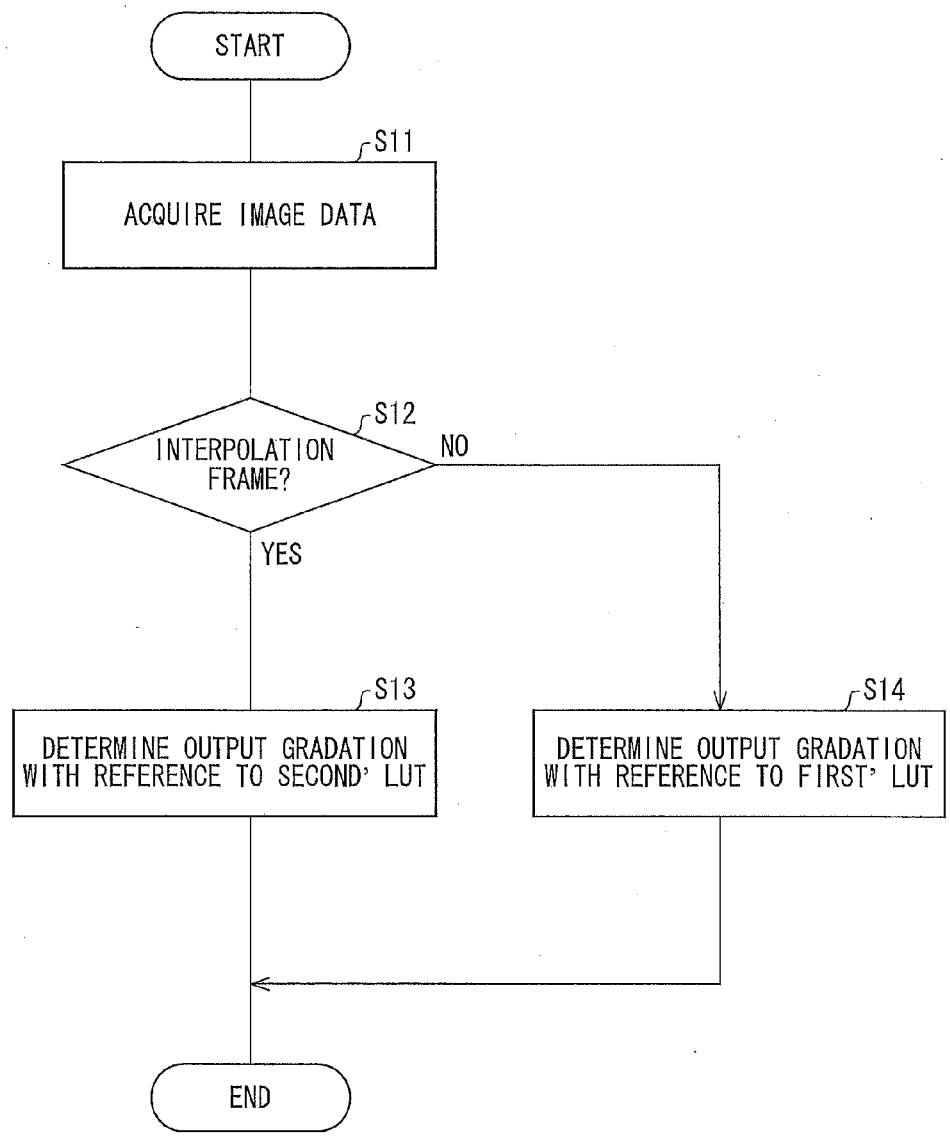

FIG. 13 is a flow chart showing an operation of an overshooting section of Embodiment 2.

Figure 14:
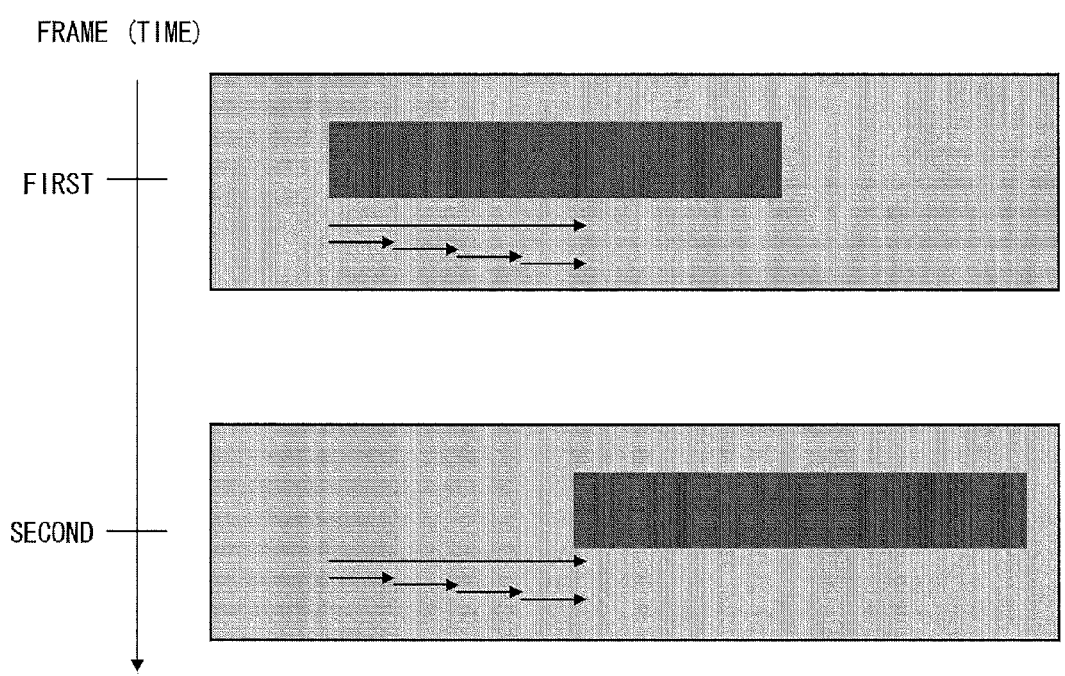

FIG. 14 is a diagram explaining a frame interpolation technique of Embodiment 2, and illustrates images of first and second frames (key frames).

Figure 15:
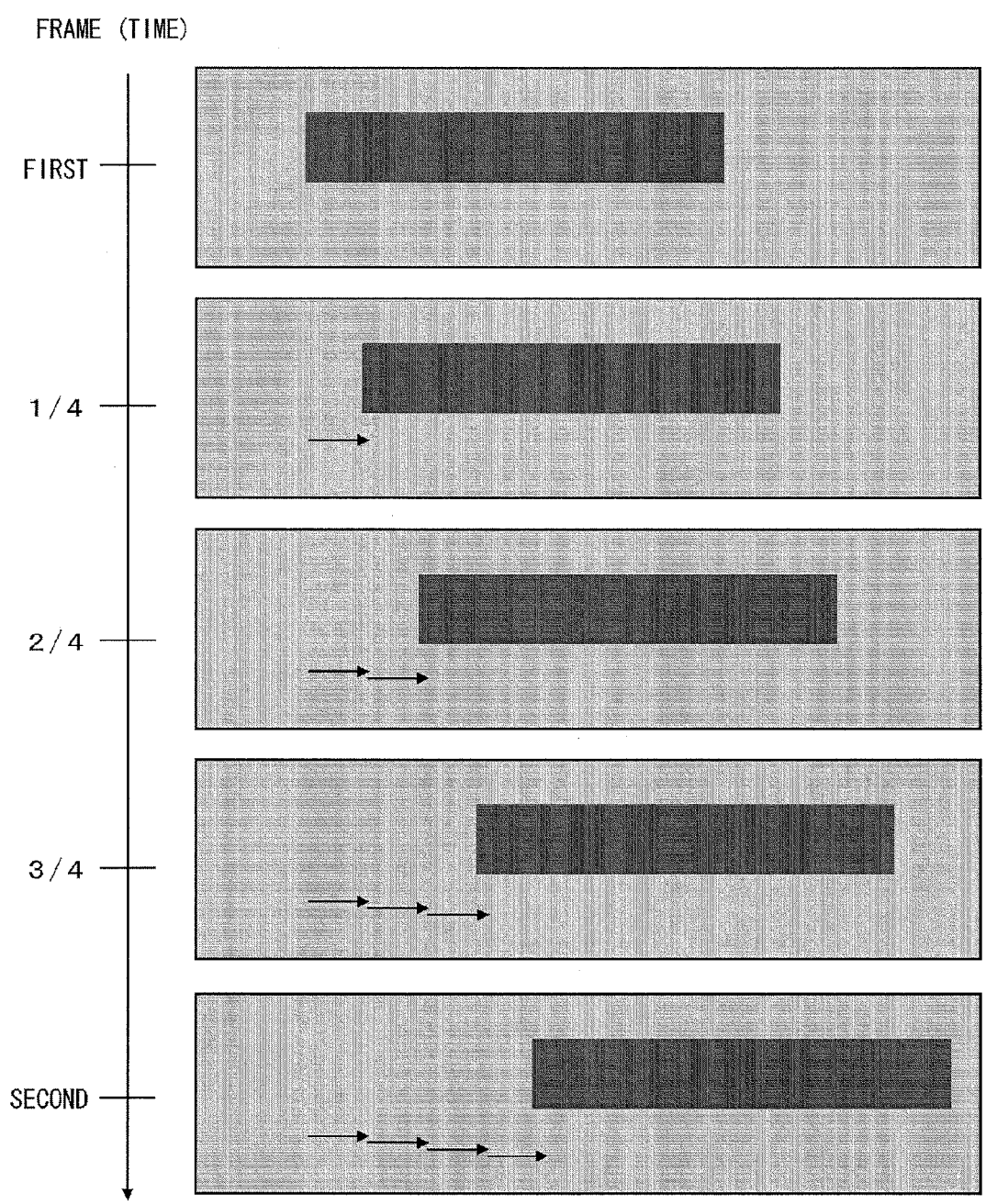

FIG. 15 is a diagram explaining a frame interpolation technique of Embodiment 2, and illustrates a state in which three interpolation frames are inserted in first and second frame periods.

Figure 16:
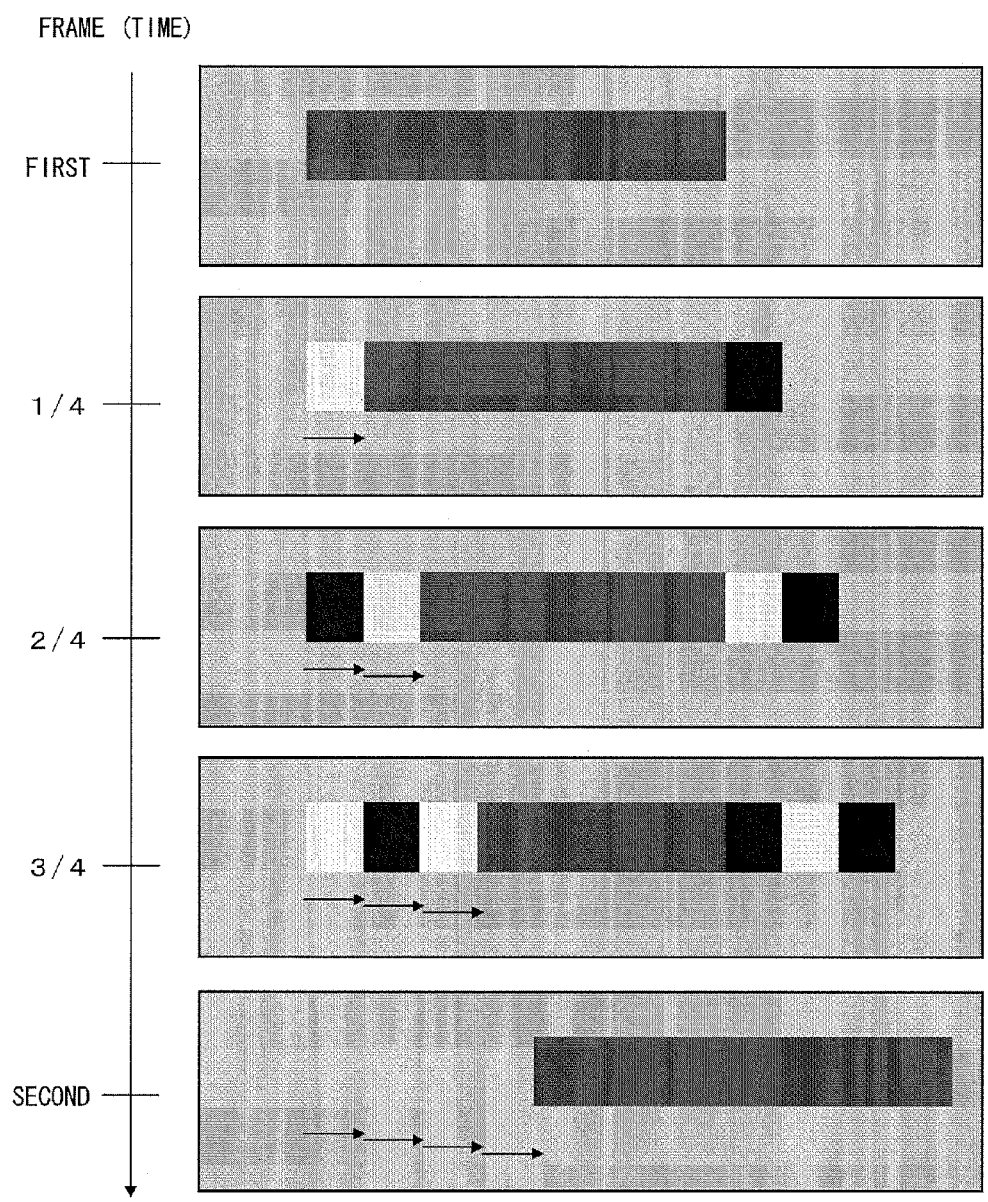

FIG. 16 is a diagram illustrating interpolation frames generated according to the frame interpolation technique of Embodiment 2.

Figure 17:
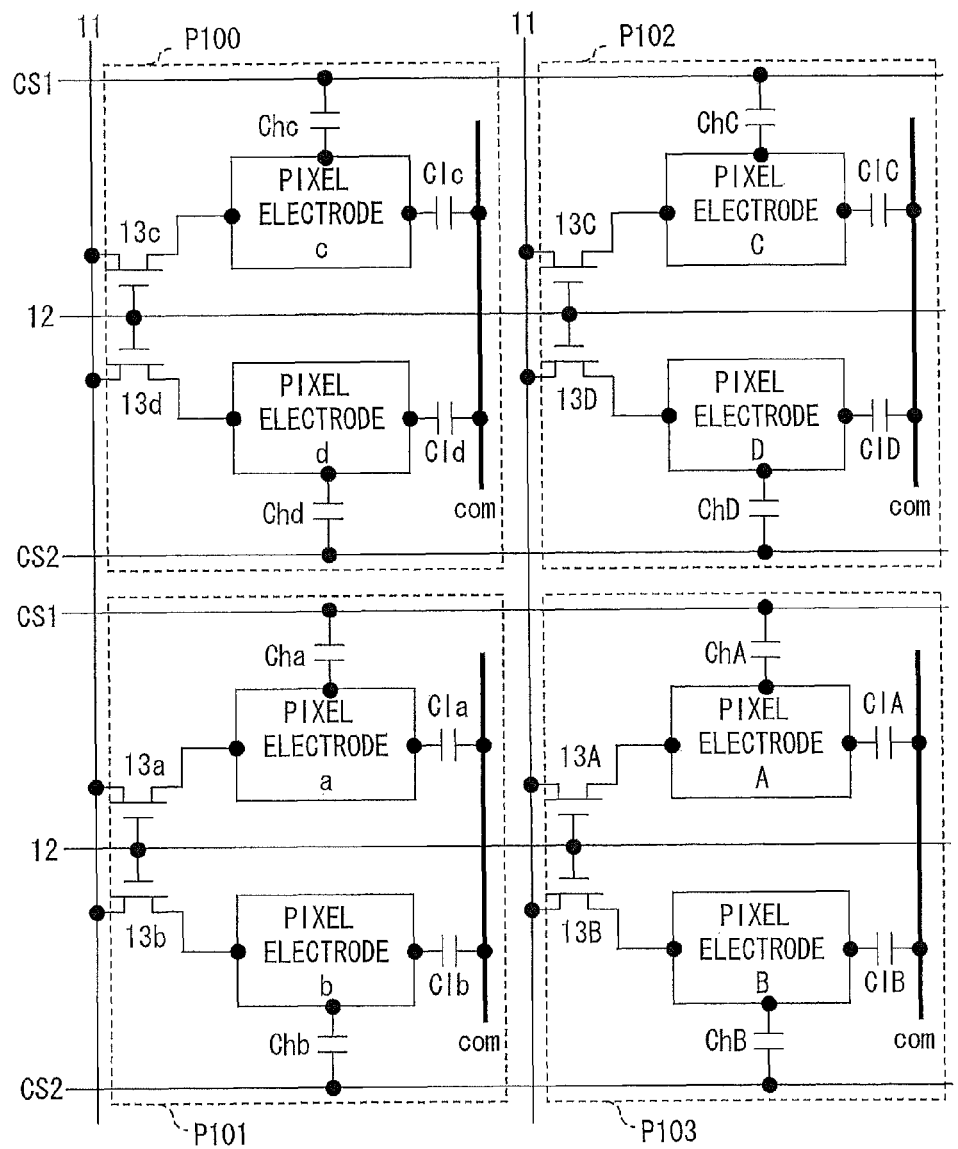

FIG. 17 is a circuit diagram illustrating another configuration of the present liquid crystal display device.

Figure 18:
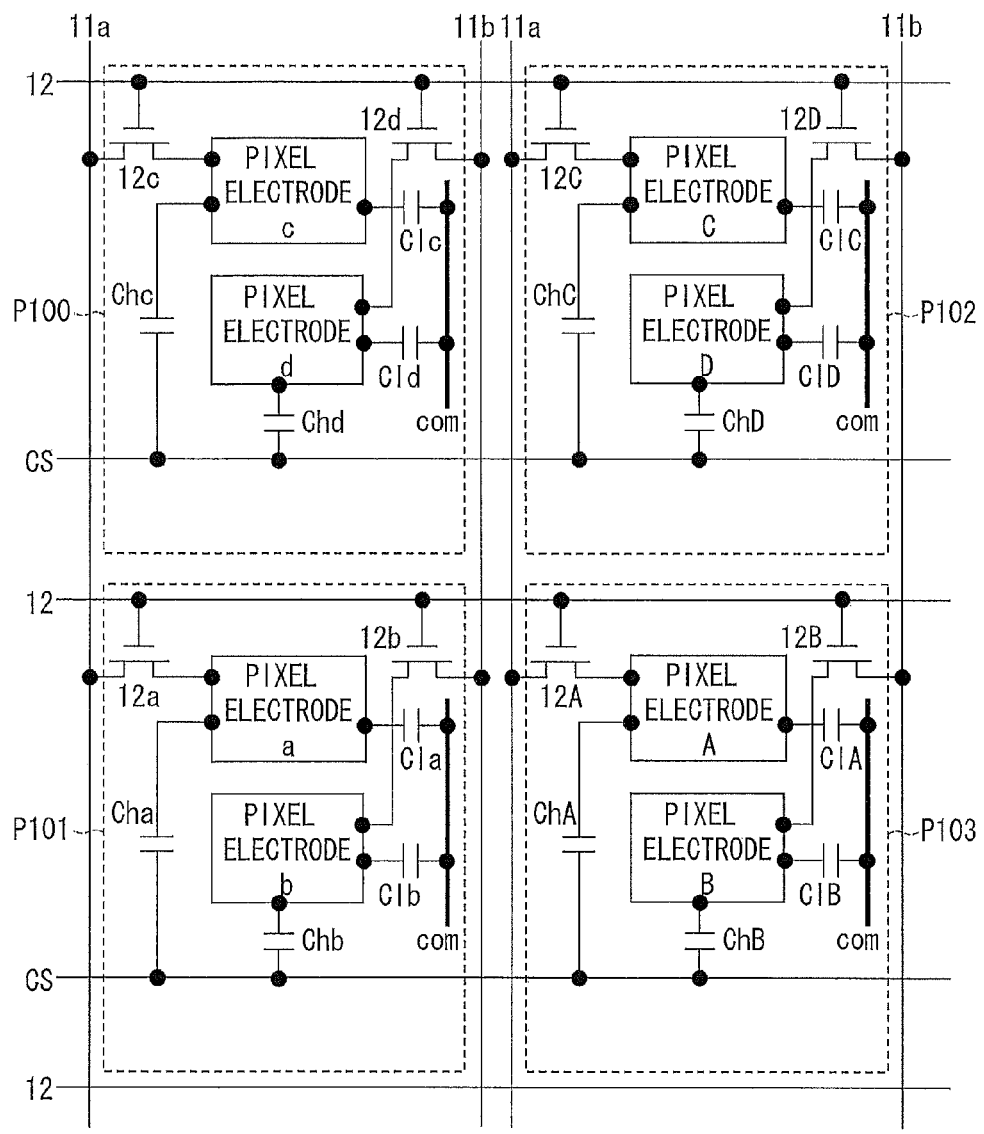

FIG. 18 is a circuit diagram illustrating another configuration of the present liquid crystal display device.

Figure 19:
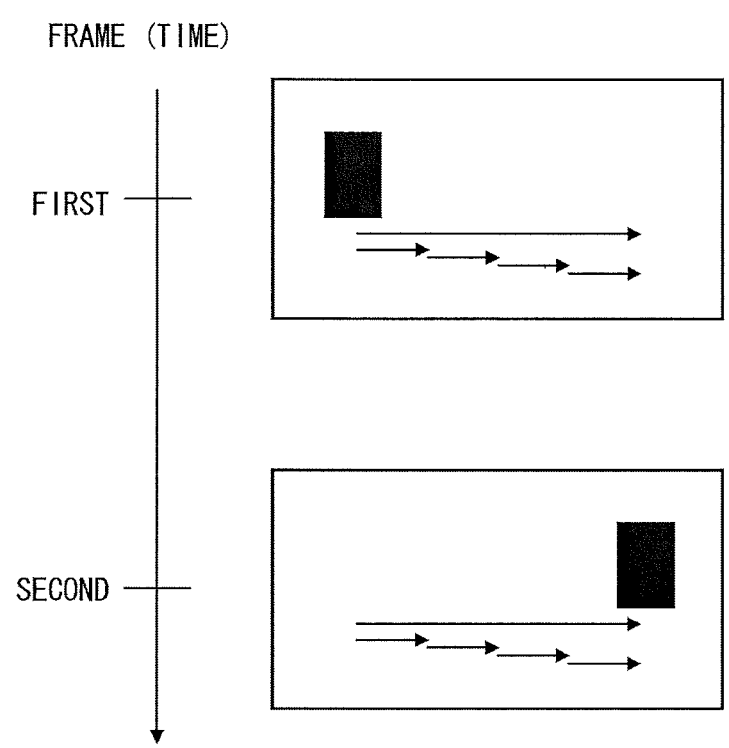

FIG. 19 is a diagram explaining a conventional frame interpolation technique, and illustrates images of first and second frames.

Figure 20:
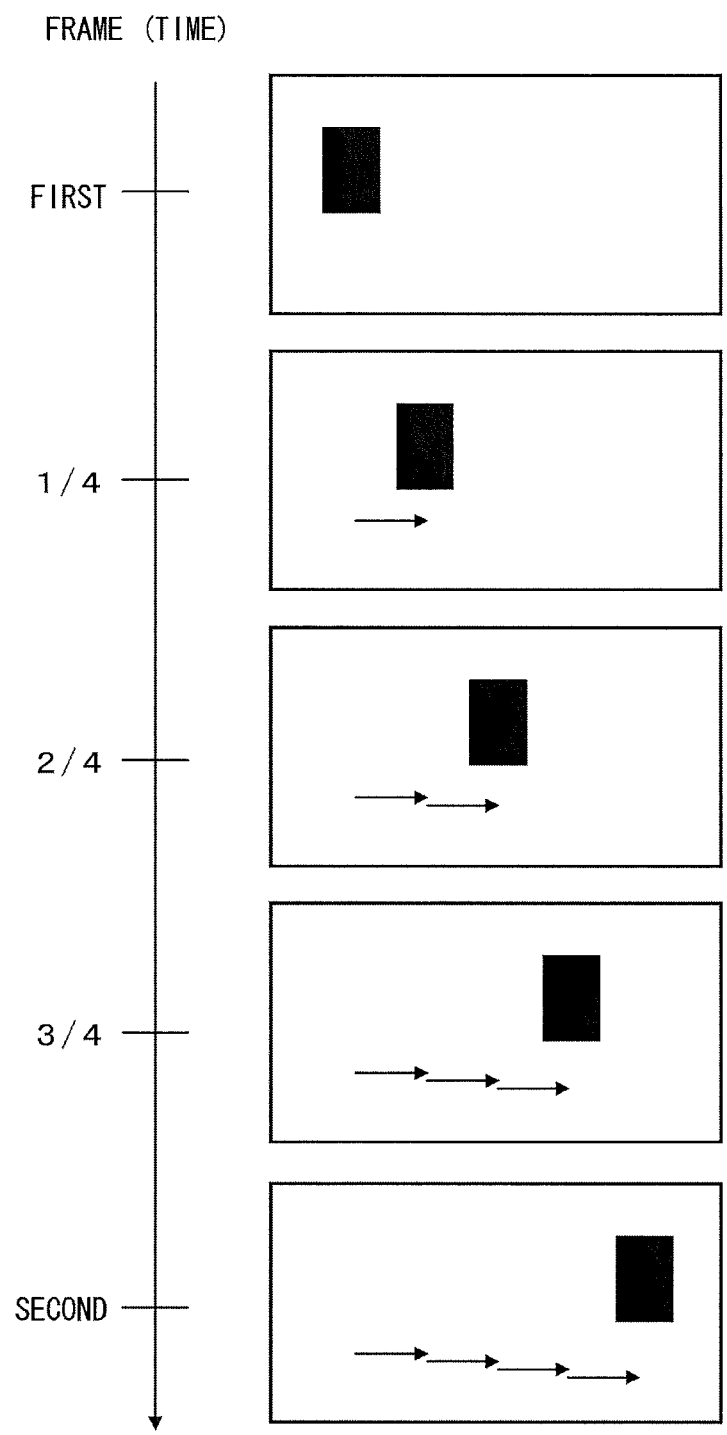

FIG. 20 is a diagram illustrating a state in which three interpolation frames are inserted within first and second frame periods in a conventional frame interpolation technique.

Figure 21:
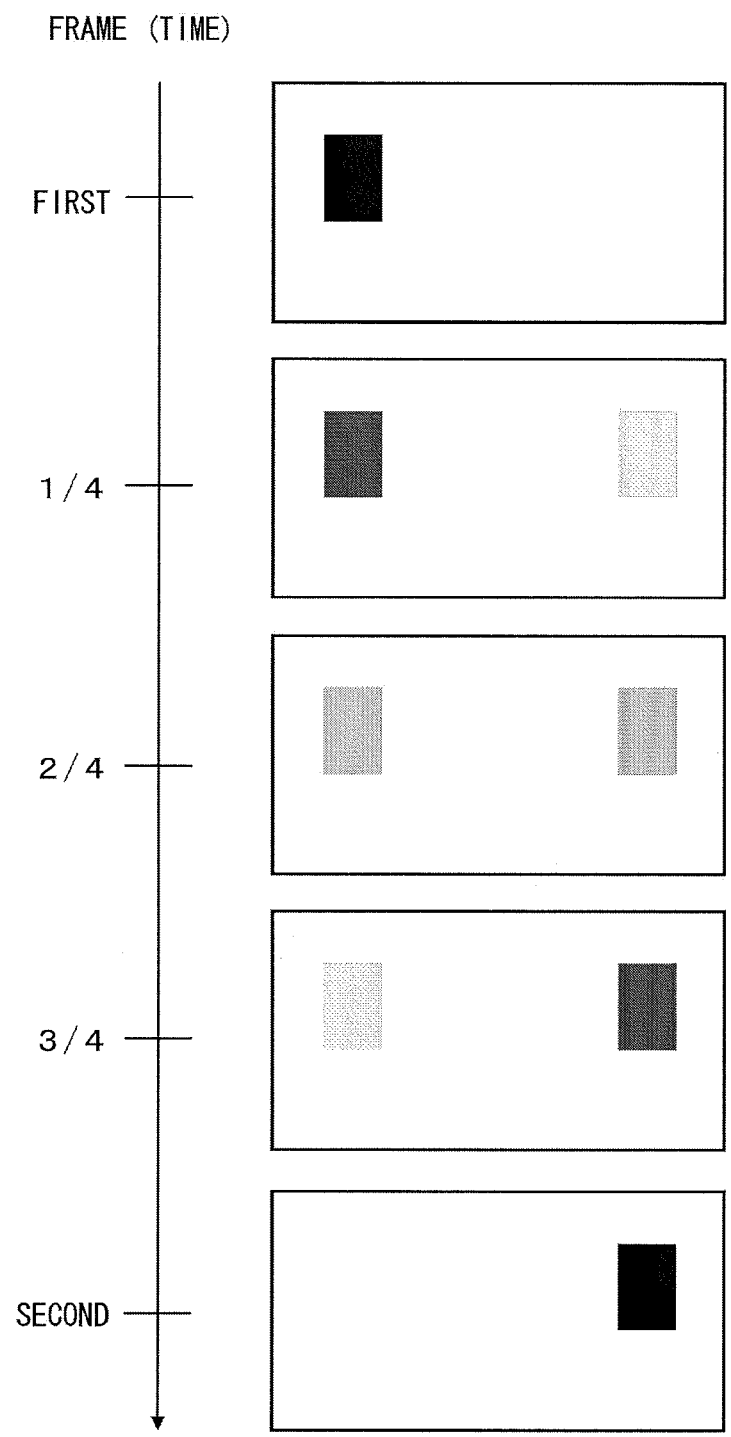

FIG. 21 is a diagram illustrating a state in which interpolation frames having an intermediate gradation are inserted in a conventional frame interpolation technique.

Figure 22:
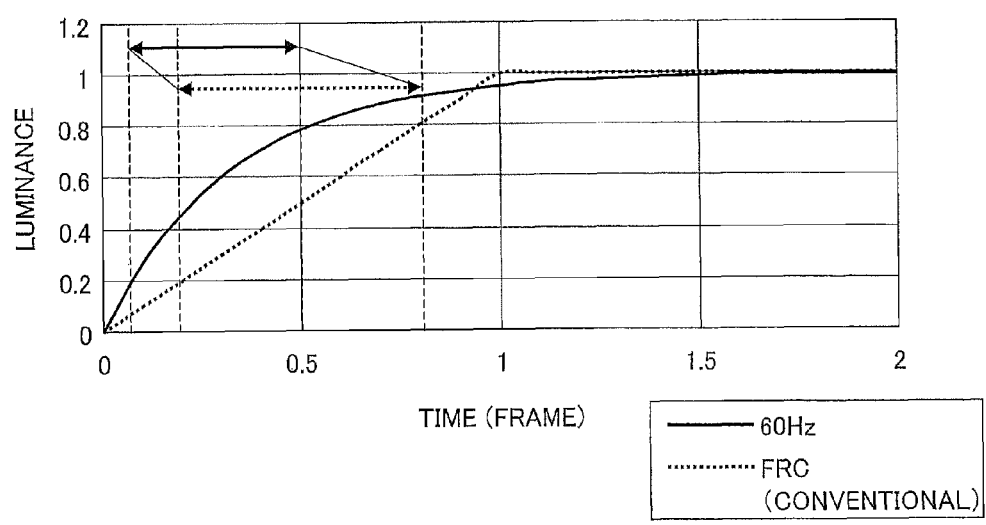

FIG. 22 is a graph showing relationship between an attained gradation (luminance) and a frame in a conventional frame interpolation technique.

DESCRIPTION OF EMBODIMENTS

Embodiment 1

Embodiment 1 of the present invention is described below with reference to the drawings.

Figure 1:
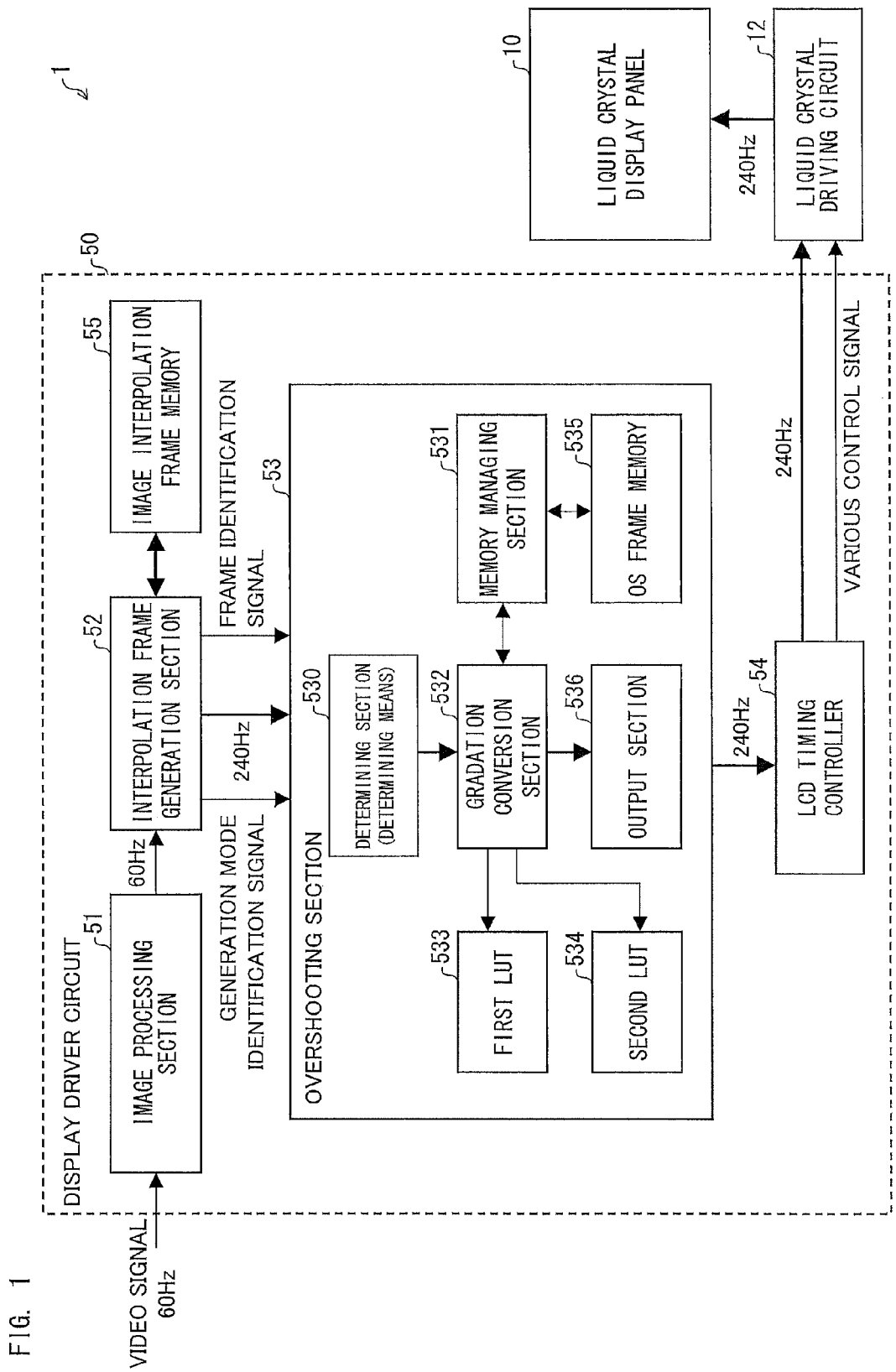
FIG. 1 is a block diagram illustrating an overall configuration of a liquid crystal display device of Embodiment 1.
Figure 2:
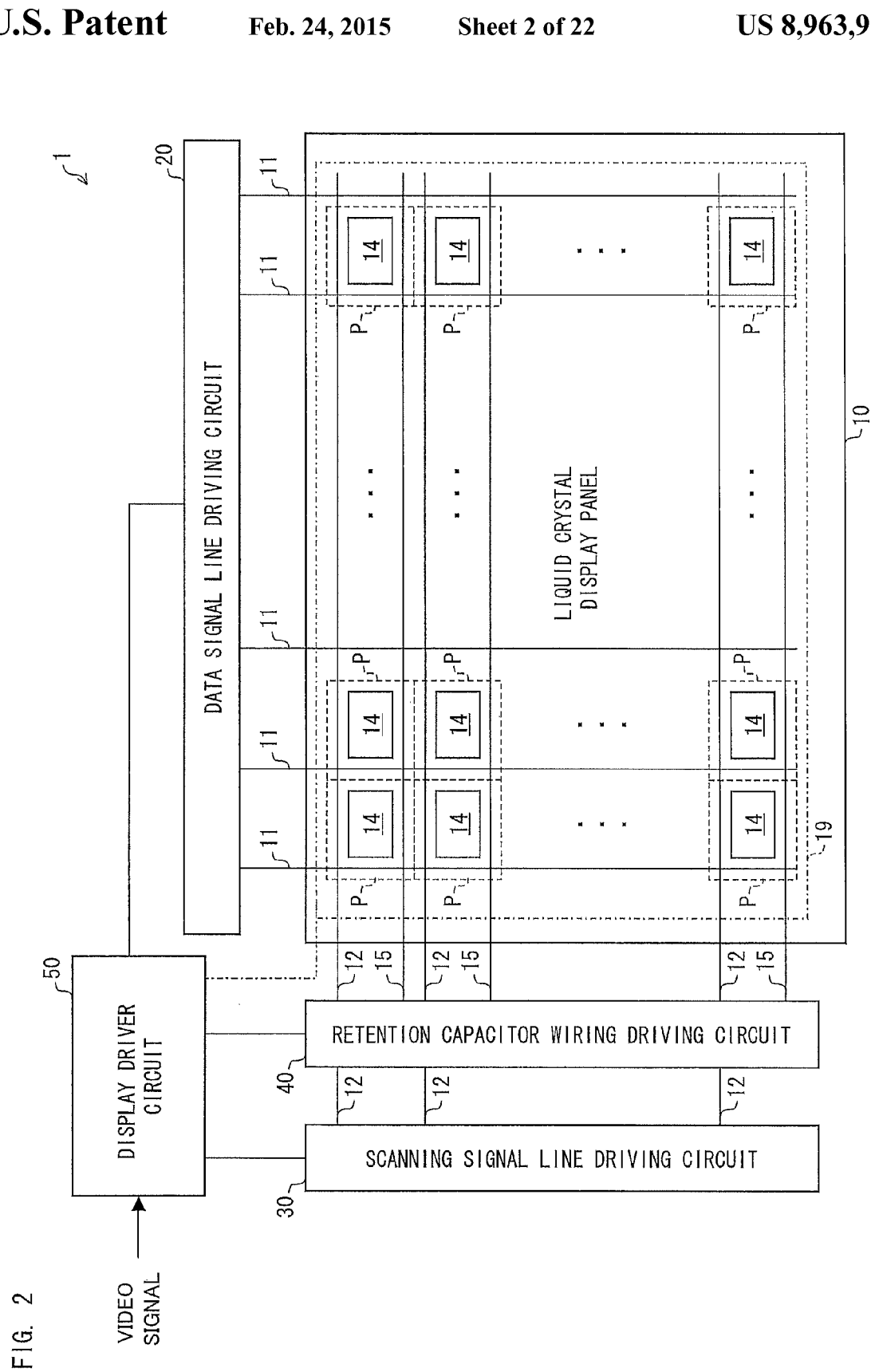
FIG. 2 is a diagram illustrating an outline configuration of a liquid crystal display panel of the liquid crystal display device of FIG. 1.
Figure 3:
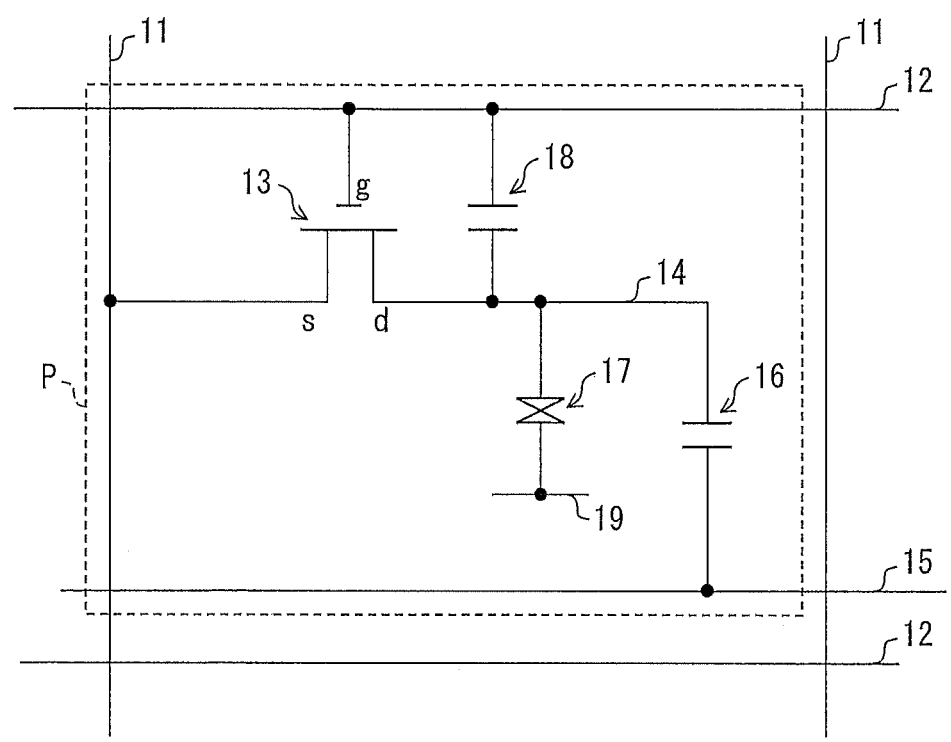
FIG. 3 is an equivalent circuit diagram illustrating an electrical configuration of each pixel in the liquid crystal display panel of FIG. 2.

First, a configuration of a liquid crystal display device 1 of the present invention is described with reference to FIGS. 1 through 3. FIG. 1 is a block diagram illustrating an overall configuration of the liquid crystal display device 1. FIG. 2 is a diagram illustrating an outline configuration of a liquid crystal display panel 10. FIG. 3 is an equivalent circuit diagram illustrating an electrical configuration of each pixel of the liquid crystal display panel 10.

The liquid crystal display device 1 includes the liquid crystal display panel 10; and a data signal line driving circuit (source driver) 20, a scanning signal line driving circuit (gate driver) 30, and a retention capacitor wiring driving circuit (CS driver) 40 which constitute a liquid crystal driving circuit; and a display driver circuit 50.

The liquid crystal display panel 10 includes an active matrix substrate, a counter substrate, and liquid crystals sandwiched between the active matrix substrate and the counter substrate although these members are not illustrated. The liquid crystal display panel 10 has a large number of pixels P that are arranged in rows and columns.

The liquid crystal display panel 10 includes, on the active matrix substrate, data signal lines 11, scanning signal lines 12, and switching elements (thin film transistors (hereinafter referred to as "TFTs")) 13, pixel electrodes 14, and retention capacitor wirings 15. Further, the liquid crystal display panel 10 includes, on the counter substrate, counter electrodes 19.

The data signal lines 11 are provided in parallel with each other in a column direction (vertical direction) so that a single data signal line 11 is provided for each column. The scanning signal lines 12 are provided in parallel with each other in a row direction (horizontal direction) so that a single scanning signal line 12 is provided for each row. The TFT 13 and the pixel electrode 14 are provided corresponding to each intersection of the data signal lines 11 and the scanning signal lines 12. A source electrode s of the TFT 13 is connected to the data signal line 11, a gate electrode g of the TFT 13 is connected to the scanning signal line 12, and a drain electrode d of the TFT 13 is connected to the pixel electrode 14. The pixel electrode 14 forms a liquid crystal capacitor 17 with the counter electrode 19 via the liquid crystals.

With the arrangement, when a scanning signal supplied to the scanning signal line 12 turns on the gate of the TFT 13, and a data signal supplied from the data signal line 11 is written into the pixel electrode 14, an electric potential corresponding to the data signal is supplied to the pixel electrode 14. As a result, a voltage corresponding to the data signal is applied to the liquid crystals that are present between the pixel electrode 14 and the counter electrode 19. Thus, a gradation corresponding to the data signal can be displayed.

The retention capacitor wirings 15 are provided in parallel with each other in the row direction (horizontal direction) so that a single retention capacitor wiring 15 is provided for each row. The retention capacitor wirings 15 are provided so as to be paired with the respective scanning signal lines 12. Each of the retention capacitor wirings 15 forms a retention capacitor 16 (referred to also as "auxiliary capacitor") with a pixel electrode 14 of a corresponding row, and thus capacitively coupled with the pixel electrode 14.

The liquid crystal display panel 10 configured as above is driven by the data signal line driving circuit 20, the scanning signal line driving circuit 30, and the retention capacitor wiring driving circuit 40. The display driver circuit 50 supplies various signals necessary for driving the liquid crystal display panel 10 to the data signal line driving circuit 20, the scanning signal line driving circuit 30, and the retention capacitor wiring driving circuit 40.

In the present embodiment, a horizontal scanning period for each row is sequentially assigned in an active period (effective scanning period) in a vertical scanning period that is periodically repeated. Thus, the rows are sequentially scanned. For this purpose, the scanning signal line driving circuit 30 sequentially supplies, in synchronization with a horizontal scanning period for each row, a scanning signal for turning on the TFT 13 to a scanning signal line 12 corresponding to the row.

The data signal line driving circuit 20 supplies a data signal to each of the data signal lines 11. The data signal is obtained as follows. Specifically, a video signal supplied to the data signal line driving circuit 20 via the display driver circuit 50 is assigned to each column in the data signal line driving circuit 20, and is boosted etc. Thus, the data signal is obtained.

The retention capacitor wiring driving circuit 40 supplies a CS signal to each of the retention capacitor wirings 15. The CS signal is, for example, set to a constant electric potential (Vcom).

The display driver circuit 50 controls the scanning signal line driving circuit 30, the data signal line driving circuit 20, and the retention capacitor wiring driving circuit 40 so that the scanning signal line driving circuit 30, the data signal line driving circuit 20, and the retention capacitor wiring driving circuit 40 output the scanning signal, the data signal, and the CS signal, respectively. Moreover, the display driver circuit 50 carries out frame interpolation and overshooting.

The following describes a specific configuration of the display driver circuit 50 with reference to FIG. 1. In the present embodiment, it is assumed that a video signal of 60 frames per second (60 Hz) is supplied from an external signal source to the display driver circuit 50, and that the frame rate of the video signal is converted into 240 frames (240 Hz) by frame interpolation in the display driver circuit 50. That is, the present embodiment deals with an example in which the liquid crystal display device 1 carries out quad-speed drive. Note that the conversion rate of the frame rate is not limited to four-fold, and can be, for example, two-fold or three-fold.

The display driver circuit 50 includes an image processing section 51, an interpolation frame generation section (interpolation frame generation means) 52, an overshooting section (overshooting means) 53, an LCD timing controller 54, and an image interpolation frame memory 55.

The image processing section 51 carries out image adjustment such as adjustment of resolution, tinge, gradation characteristic, and gamma characteristic, size conversion, and the like with respect to a video signal supplied at 60 Hz from an external signal source. Thus, the video signal becomes a signal suitable for the liquid crystal display panel 10. The image processing is preferably carried out at an initial stage (carried out with respect to a video signal acquired from the signal source). This is because the video signal acquired from the signal source has a small margin of error and a low frequency, and therefore a load on the circuit can be made small. The image processing section sequentially supplies the video signal (image data) subjected to the image processing to the interpolation frame generation section 52.

The interpolation frame generation section 52 causes a frame (key frame) corresponding to the image data acquired from the image processing section 51 to be stored in the image interpolation frame memory 55. In the image interpolation frame memory 55, image data corresponding to approximately two to nine frames are stored. In the present embodiment, it is, for example, assumed that image data corresponding to six frames (first through sixth key frames) are stored. The interpolation frame generation section 52 generates an image of a frame (interpolation frame) to be inserted between the key frames on the basis of image data corresponding to a plurality of frames (e.g., three preceding and succeeding frames) stored in the image interpolation frame memory 55. In the present embodiment, for the purpose of achieving quad-speed drive, images of three interpolation frames (first through third interpolation frames) are generated in 1 frame period (between the key frames). For example, in 1 frame period between the third key frame and the fourth key frame, an interpolation frame (first interpolation frame) to be inserted after elapse of ¼ frame, an interpolation frame (second interpolation frame) to be inserted after elapse of 2/4 frame, and an interpolation frame (third interpolation frame) to be inserted after elapse of ¾ frame are generated. In the present embodiment, the single interpolation frame generation section 52 generates images of three interpolation frames. However, if this processing is difficult because of high frequency, another arrangement is also possible in which two interpolation frame generation sections 52 are used, for example. In this case, one of the two interpolation frame generation sections 52 generates images of first and third interpolation frames, and the other one of the two interpolation frame generation sections 52 generates an image of a second interpolation frame, and these images are outputted after output timings of the images are adjusted.

The following describes a method for generating an interpolation frame. An interpolation frame can be generated by a known technique. There are two modes for generating an interpolation frame, i.e., a first mode and a second mode which are switched from each other depending on whether a motion vector has been calculated or not.

Specifically, a motion vector is calculated on the basis of images of preceding and succeeding frames by using a block matching method, and in a case where the motion vector is properly calculated, an interpolation frame in which a position of an object is estimated on the basis of the motion vector thus calculated is generated (first generation mode). In the present embodiment, a motion vector is calculated on the basis of positional information etc. of an object in images of three preceding and succeeding frames, and first through third interpolation frames are generated on the basis of the motion vector thus calculated (see FIG. 20). Meanwhile, in a case where the motion vector is not properly calculated (e.g., (i) a case where the travel distance of the object exceeds the search range, (ii) a case where the travel distance of the object falls in the search range, but an object displayed in a first frame and an object displayed in a second frame are not recognized as an identical object, (iii) or a case where a video signal is not a signal of a moving image), no interpolation frame corresponding to the motion vector is not generated, but instead an interpolation frame having an intermediate gradation is generated (second generation mode (see FIG. 21)).

After the interpolation frames are thus generated, the interpolation frame generation section 52 sequentially supplies, at a frame frequency of 240 Hz, the image data of the key frames acquired from the image processing section 51 and image data of the interpolation frames thus newly generated. In the above example, the interpolation frame generation section 52 supplies the image data in the order of the third key frame, the first interpolation frame, the second interpolation frame, the third interpolation frame, and the fourth key frame. Further, the interpolation frame generation section 52 outputs, for each of the image data, (i) a generation mode identification signal for distinguishing between the first generation mode and the second generation mode, and (ii) a frame identification signal for distinguishing between a key frame and an interpolation frame. Specifically, the interpolation frame generation section 52 can be configured to assign each of the image data a flag indicative of the generation mode identification signal and a flag indicative of the frame identification signal.

For example, in a case where image data of 1 frame is "first generation mode/key frame", a flag "0, 0" is given to the image data, in a case where image data of 1 frame is "first generation mode/interpolation frame", a flag "0, 1" is given to the image data, in a case where image data of 1 frame is "second generation mode/key frame", a flag "1, 0" is given to the image data, and in a case where image data of 1 frame is "second generation mode/interpolation frame", a flag "1, 1" is given to the image data.

Note that another arrangement is also possible in which distinguishment between the first generation mode and the second generation mode is omitted in the case of a key frame, and distinguishment between the first generation mode and the second generation mode is made only in the case of an interpolation frame. Specifically, in a case where image data of 1 frame is "key frame", a flag "0" is given to the image data, in a case where image data of 1 frame is "first generation mode/interpolation frame", a flag "1" is given to the image data, and in a case where image data of 1 frame is "second generation mode/interpolation frame", a flag "2" is given to the image data. The following description deals with this example in which the three types of flag are given to image data.

Note that another arrangement is also possible in which the liquid crystal display device of the present invention does not distinguish between the generation modes. This arrangement is described in Embodiment 2.

The overshooting section (tone transition emphasis process section) 53 carries out an operation corresponding to the generation mode identification signal and the frame identification signal acquired from the interpolation frame generation section 52.

The overshooting section 53 includes a determining section (determining means) 530, a memory managing section 531, a gradation conversion section (gradation calculating means) 532, a first gradation conversion table (first LUT (look-up table)) 533, a second gradation conversion table (second LUT) 534, an OS frame memory 535, and an output section 536.

The determining section 530 determines, on the basis of the generation mode identification signal and the frame identification signal in the image data acquired from the interpolation frame generation section 52, whether the image data is image data of "key frame" or image data of "interpolation frame" and whether the interpolation frame was generated according to "first generation mode" or "second generation mode". The determining section 530 can carry out the determining process on the basis of the flags.

The memory managing section 531 causes image data of a current frame (key frame, interpolation frame) acquired from the interpolation frame generation section 52 to be stored in the OS frame memory 535, and reads out image data of a frame one frame before (image data of a previous frame) stored in the OS frame memory 535.

The gradation conversion section 532 calculates an attained gradation (estimated attained gradation) that is expected to be attained after the overshooting, on the basis of the image data of the previous frame and the image data of the current frame which are acquired from the memory managing section 531 and a result of the determination of the determining section 530. Further, the gradation conversion section 532 determines (sets) image data (post-gradation conversion data, emphasized gradation, output gradation) in an overshooting period of the current frame with reference to the first LUT 533 or the second LUT 534. Note that the "estimated attained gradation" is obtained by converting a luminance level (luminance value) calculation result (estimated attained luminance) into a gradation level (gradation value). A specific method for setting the post-gradation conversion data is described later.

Image data corresponding to the estimated attained gradation calculated by the gradation conversion section 532 is stored in the OS frame memory 535 via the memory managing section 531, and the post-gradation conversion data determined by the gradation conversion section 532 is supplied to the LCD timing controller 54 via the output section 536. The LCD timing controller 54 generates an image data signal for the overshooting period on the basis of the supplied image data, and supplies the image data signal to the data signal line driving circuit 20 at a predetermined timing. The LCD timing controller 54 supplies various control signals to the data signal line driving circuit 20, the scanning signal line driving circuit 30, and the retention capacitor wiring driving circuit 40.

The liquid crystal display panel 10 displays an image on the basis of various drive signals (the data signal, the scanning signal, and the CS signal) supplied from the data signal line driving circuit 20, the scanning signal line driving circuit 30, and the retention capacitor wiring driving circuit 40.

Figure 4:
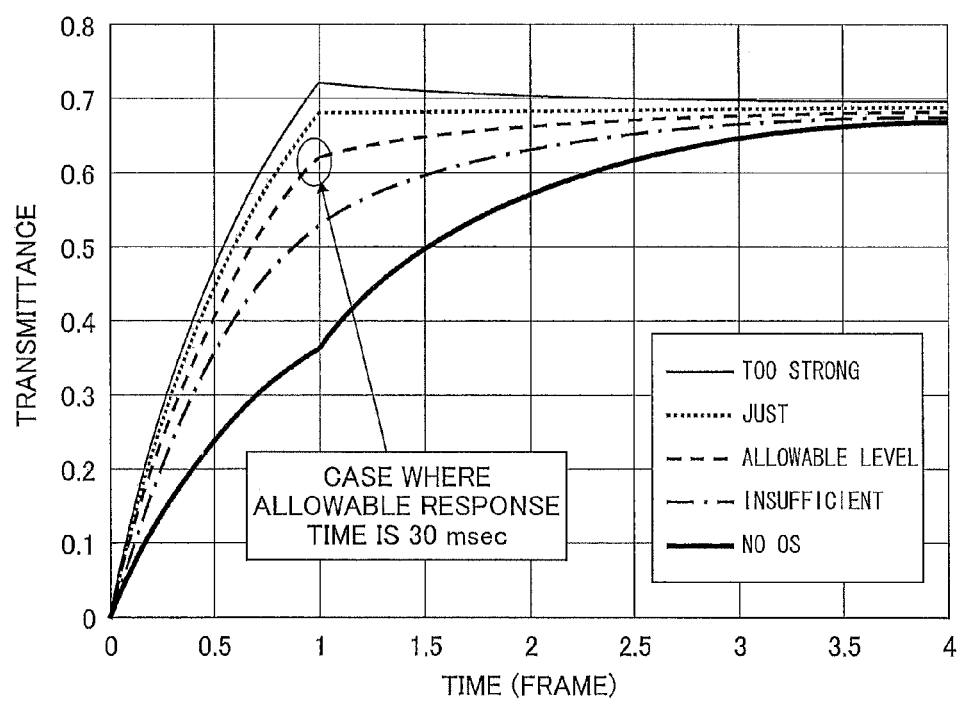
FIG. 4

The following describes an emphasis level (also referred to as a conversion level or an OS level) in the overshooting (OS processing). FIG. 4 is a graph showing relationship between time and transmittance for each conversion level of the OS processing. As shown in the graph, the conversion level of the OS processing is classified into a plurality of levels such as "strong level", "just level", "weak level", "no OS", and is adjusted in consideration of "allowable level" which is set in accordance with characteristics of a liquid crystal display device. A response improvement level of the liquid crystals varies depending on this conversion level. In order to properly carry out this technique, a feedback system is used which switches an LUT depending on an environment or which judges an attained level (attained gradation) attained after the OS processing and sets the result thus obtained as previous frame data (start gradation) to deal with inevitable insufficiency of response like the case of full gradation response.

Next, the following describes a specific method for setting the post-gradation conversion data.

As described above, the overshooting section 53 carries out an operation corresponding to the generation mode identification signal and the frame identification signal acquired from the interpolation frame generation section 52. That is, an emphasis level of tone transition for image data of a frame varies depending on the generation mode identification signal and the frame identification signal. Accordingly, the overshooting section 53 includes the first LUT and the second LUT, and switches an LUT to be referred to (the first LUT or the second LUT) in accordance with a type of the current frame acquired from the interpolation frame generation section 52. For example, such an arrangement is possible in which in a case where image data of 1 frame is "second generation mode/interpolation frame", i.e., in a case where a flag given to the image data is "2", the overshooting section 53 refers to the second LUT, and in the other cases (a case where a flag given to the image data is "0" and a case where a flag given to the image data is "1"), the overshooting section 53 refers to the first LUT.

The following discusses an example in which interpolation frames are generated according to the second generation mode as shown in FIG. 21. For example, the following discusses an example in which an object disappears during a period from a frame 0 to a frame 3, specifically an example in which luminance of an input image is "0" (black) during a period from the frame 0 to the frame 1 and changes to "1" (white) in the frame 2. In the case of such an object, no interpolation frame corresponding to the motion vector is generated. Instead, in the case of quad-speed drive, a time-average is taken in a 1 frame period, and interpolation frames are inserted at respective points of ¼ frame, 2/4 frame, and ¾ frame so that gradation changes with time, as illustrated in FIG. 21.

Specifically, first, in a case where, at the point of a frame 0, luminance of an inputted image is "0" and luminance of image data (FRC image) acquired from the interpolation frame generation section 52 is "0", the overshooting section 53 calculates an estimated attained luminance on the basis of the generation mode identification signal and the frame identification signal acquired from the interpolation frame generation section 52. Here, an estimated attained luminance corresponding to "key frame" is calculated. In this case, the estimated attained luminance is set so that a gradation attained after the overshooting agrees with a target gradation (just setting). That is, since the luminance is "0" at the point of the frame 0, the estimated attained luminance is also set to "0". Then, the post-gradation conversion data of the overshooting period is set with reference to the first' LUT on the basis of estimated attained gradation corresponding to the estimated attained luminance thus calculated and a display gradation (start gradation) of an immediately preceding frame.

Next, in a case where the luminance of the image data (FRC image) acquired by the interpolation frame generation section 52 is still "0" at the point of a frame 0.25, the overshooting section 53 calculates an estimated attained luminance on the basis of generation mode identification signal and the frame identification signal acquired from the interpolation frame generation section 52. Here, an estimated attained luminance corresponding to "second generation mode/interpolation frame" is calculated. In this case, the estimated attained luminance is set so that a gradation attained after the overshooting becomes larger than a target gradation (strong setting). Since the luminance at the point of the frame 0.25 is same as that of the previous frame, the estimated attained luminance is set to "0". Then, the post-gradation conversion data of the overshooting period is set with reference to the second LUT on the basis of an estimated attained gradation corresponding to the estimated attained luminance thus calculated and a display gradation (start gradation) of an immediately preceding frame.

At the points of frames 0.5 and 0.75, processing similar to the processing carried out at the point of the frame 0.25 is carried out, and at the point of a frame 1, the processing at the point of the frame 0 is carried out. That is, during the period from the frame 0 to the frame 1, the estimated attained luminance is set to "0".

Subsequently, in a case where, at the point of a frame 1.25, the luminance of the image data (FRC image) acquired from the interpolation frame generation section 52 is "0.25", the overshooting section 53 calculates an estimated attained luminance on the basis of the generation mode identification signal and the frame identification signal acquired from the interpolation frame generation section 52. Here, an estimated attained luminance corresponding to "second generation mode/interpolation frame" is calculated. In this case, since the estimated attained luminance is set so that a gradation attained after the overshooting becomes larger than a target gradation ("strong setting"), the attained luminance is set, for example, to "0.35" so as to be larger that the target luminance "0.25" by 40%.

The overshooting section 53 has a feedback function. That is, an estimated attained luminance in a current frame is used for calculation of an estimated attained luminance in a next frame (equivalent to a display luminance corresponding to display gradation of the previous frame). This makes it possible to avoid display troubles such as white flash which occurs in a case where a tone transition amount becomes too large.

In a case where an estimated attained luminance is set to be larger than a target luminance by 40%, the estimated attained luminance is calculated by the following equation:

estimated attained luminance=luminance corresponding to display gradation of previous frame+(luminance corresponding to input gradation of current frame−luminance corresponding to display gradation of previous frame)×1.4

Since, at the point of the frame 1.25, the luminance has been changed from 0 to 0.25, the estimated attained luminance is calculated as follows:

0+(0.25−0)×1.4=0.35

Then, post-gradation conversion data (output gradation) of the overshooting period is set with reference to the second LUT on the basis of an estimated attained gradation corresponding to the estimated attained luminance thus calculated and a display gradation (start gradation) of the immediately preceding frame.

Next, in a case where, at the point of a frame 1.5, the luminance of the image data (FRC image) acquired from the interpolation frame generation section 52 is "0.5", the overshooting section 53 calculates an estimated attained luminance on the basis of the generation mode identification signal and the frame identification signal acquired from the interpolation frame generation section 52. Here, an estimated attained luminance corresponding to "second generation mode/interpolation frame" is calculated. Since the luminance of the previous frame is "0.35" and the luminance of the current frame is "0.5", the estimated attained luminance is calculated as follows in accordance with the above equation:

estimated attained luminance=0.35+(0.5−0.35)× 1.4=0.56

Then, post-gradation conversion data (output gradation) of the overshooting period is set with reference to the second LUT on the basis of an estimated attained gradation corresponding to the estimated attained luminance thus calculated and a display gradation (start gradation) of the immediately preceding frame.

Next, in a case where, at the point of a frame 1.75, the luminance of the image data (FRC image) acquired from the interpolation frame generation section 52 is "0.75", the overshooting section 53 calculates an estimated attained luminance on the basis of the generation mode identification signal and the frame identification signal acquired from the interpolation frame generation section 52. Here, an estimated attained luminance corresponding to "second generation mode/interpolation frame" is calculated. Since the luminance of the previous frame is "0.56" and the luminance of the current frame is "0.75", the estimated attained luminance is calculated as follows in accordance with the above equation:

estimated attained luminance=0.56+(0.75−0.56)× 1.4=0.826

Then, post-gradation conversion data (output gradation) of the overshooting period is set with reference to the second LUT on the basis of an estimated attained gradation corresponding to the estimated attained luminance thus calculated and a display gradation (start gradation) of the immediately preceding frame.

Next, in a case where, at the point of a frame 2, a luminance of an inputted image is "1" and a luminance of image data (FRC image) acquired from the interpolation frame generation section 52 is "1", the overshooting section 53 calculates an estimated attained luminance on the basis of the generation mode identification signal and the frame identification signal acquired from the interpolation frame generation section 52. Here, an estimated attained luminance corresponding to "key frame" is calculated. In this case, the estimated attained luminance is set so that a gradation attained after the overshooting agrees with a target gradation (just setting). That is, since the luminance is "1" at the point of the frame 2, the estimated attained luminance is also set to "1". Then, post-gradation conversion data of the overshooting period is set with reference to the first LUT on the basis of an estimated attained gradation corresponding to the estimated attained luminance thus calculated and a display gradation (start gradation) of an immediately preceding frame.

Next, in a case where, at the point of a frame 2.25, the luminance of the image data (FRC image) acquired by the interpolation frame generation section 52 is still "1", the overshooting section 53 calculates an estimated attained luminance on the basis of generation mode identification signal and the frame identification signal acquired from the interpolation frame generation section 52. Here, an estimated attained luminance corresponding to "second generation mode/interpolation frame" is calculated. In this case, the estimated attained luminance is set so that a gradation attained after the overshooting becomes larger than a target gradation (strong setting). Since the luminance at the point of the frame 2.25 is the same as that of the previous frame, the estimated attained luminance is set to "1". Then, post-gradation conversion data of the overshooting period is set with reference to the first LUT on the basis of an estimated attained gradation corresponding to the estimated attained luminance thus calculated and a display gradation (start gradation) of an immediately preceding frame.

In the subsequent key frames (frame 3, frame 4, . . . ), the processing carried out in the frame 2 is carried out, and in the subsequent interpolation frames (frame 2.5, frame 2.75, . . . ), the processing carried out in the frame 2.25 is carried out.

FIG. 5 shows relationship between a frame (current frame) supplied to the overshooting section 53 and an estimated attained luminance calculated by the above processing. FIG. 5 shows, from the left column, (i) a frame, which corresponds to elapse of time, (ii) a luminance of an input image, (iii) a luminance of image data (FRC image) outputted from the interpolation frame generation section 52, (iv) a type of the frame identification signal for distinguishing a key frame and an interpolation frame, (v) a luminance corresponding to a target gradation in the case of conventional overshooting, (vi) an estimated attained luminance in the case of the overshooting of the present invention, and (vii) an emphasis level (OS level) of a tone (luminance) transition amount. Since quad-speed drive is carried out in the present embodiment, interpolation frames respectively corresponding to the frame 0.25, frame 0.5, and frame 0.75 are inserted in the period from the frame 0 to the frame 1.

FIG. 5 shows a case corresponding to the above example, i.e., a case where a luminance of an input image is "0" during the period from the frame 0 to the frame 1 and becomes "1" in the frame 2. During the period from the frame 0 to the frame 1, an interpolation frame (1) having a luminance of 0.25, an interpolation frame (2) having a luminance of 0.5, and an interpolation frame (3) having a luminance of 0.75 are generated and inserted. In the conventional arrangement, an estimated attained luminance of an interpolation frame is set so that an emphasis level of a luminance of each of the interpolation frames (1) through (3) is same as that of a luminance of the FRC image (just setting). Meanwhile, in the present embodiment, an estimated attained luminance of an interpolation frame is set so that a luminance of each of the interpolation frames (1) through (3) becomes larger than a luminance of the FRC image ("strong level").

Specifically, in FIG. 5, the estimated attained luminance is set to be larger than the luminance of the FRC image by 40%. That is, in the conventional arrangement, the estimated attained luminance of the interpolation frame (1) having the luminance of 0.25 is set to the same level (just level) as the luminance (0.25) of the FRC image. Meanwhile, in the present embodiment, the estimated attained luminance of the interpolation frame (1) having the luminance of 0.25 is set to 0.35 (strong level). Further, in the conventional arrangement, the estimated attained luminance of the interpolation frame (2) having the luminance of 0.5 is set to the same level (just level) as the luminance (0.5) of the FRC image. Meanwhile, in the present embodiment, the estimated attained luminance of the interpolation frame (2) having the luminance of 0.5 is set to 0.56 (strong level). Further, in the conventional arrangement the estimated attained luminance of the interpolation frame (3) having the luminance of 0.75 is set to the same level (just level) as the luminance (0.75) of the FRC image. Meanwhile, in the present embodiment, the estimated attained luminance of the interpolation frame (3) having the luminance of 0.75 is set to 0.826 (strong level).

Figure 6:
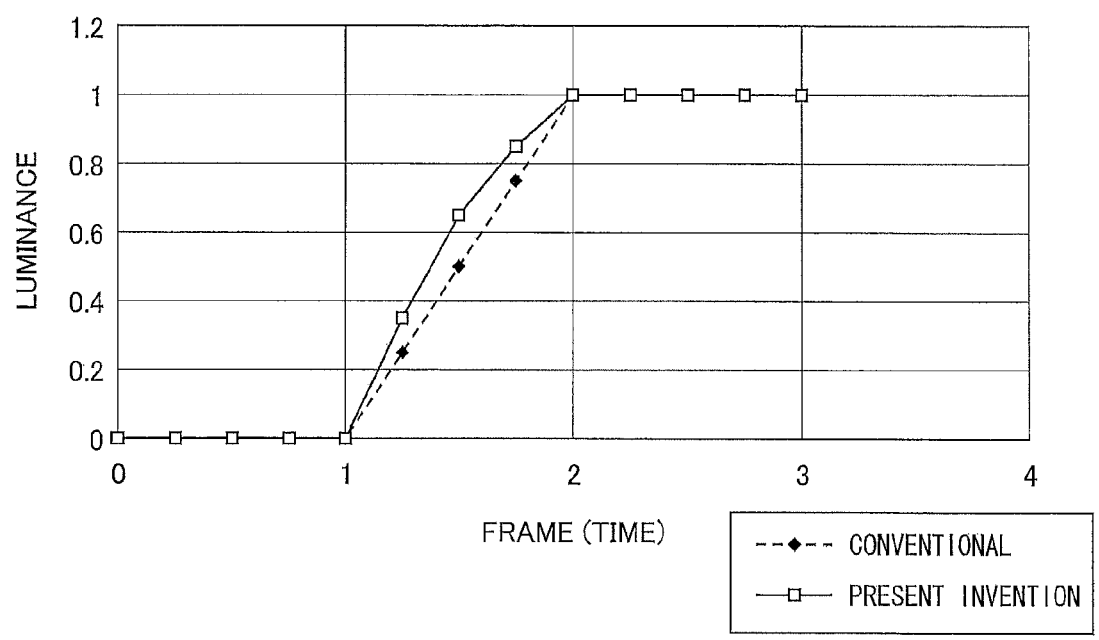
FIG. 6 is a graph showing relationship between an estimated attained luminance and a frame.

FIG. 6 is a graph showing relationship between an estimated attained luminance calculated by the above processing and a frame. As is clear from FIG. 6, according to the present embodiment, the response speed in the intermediate gradation is improved during the period from the frame 1 to the frame 2 as compared with the conventional arrangement.

FIG. 7 shows (i) a specific example of the first LUT, which is referred to in a case where the overshooting section acquires a key frame from the interpolation frame generation section 52 and (ii) a specific example of the second LUT, which is referred to in a case where the overshooting section 53 acquires an interpolation frame from the interpolation frame generation section 52. Note that the following discusses an example in which an image of 256 gradations is displayed. (a) of FIG. 7 is a table showing target gradations corresponding to the just level, and (b) of FIG. 7 shows the first LUT. (a) of FIG. 8 is a table (strong level) in which the estimated attained luminance calculated by the above processing is expressed by 256 gradations, and (b) of FIG. 8 shows the second LUT. FIG. 9 is a table showing attained gradations (display gradations) attained after the overshooting (next frame).

In the table of (a) of FIG. 7, the left-end column shows a display gradation (start gradation) of an immediately preceding frame, the upper-end row shows an input gradation (target gradation) of a current frame, and an intersection of the start gradation and the target gradation shows an estimated attained gradation in the current frame. In the first LUT shown in (b) of FIG. 7, the left-end column shows a display gradation (start gradation) of an immediately preceding frame, the upper-end row shows an input gradation (target gradation) of a current frame, and an intersection of the start gradation and the target gradation (estimated attained gradation) shows an emphasized gradation (output gradation) of post-gradation conversion data in the current frame.

In the table in (a) of FIG. 8, the left-end column shows a display gradation (start gradation) of an immediately preceding frame, the upper-end row shows an input gradation of a current frame, and an intersection of the start gradation and the input gradation shows an estimated attained gradation (target gradation) in the current frame. In the second LUT shown in (b) of FIG. 8, the left-end column shows a display gradation (start gradation) of an immediately preceding frame, the upper-end row shows an input gradation of a current frame, a right side of each column shows the estimated attained gradation of (a) of FIG. 8, and a left side of each column shows an emphasized gradation (output gradation) of post-gradation conversion data in the current frame which emphasized gradation corresponds to the start gradation and the estimated attained gradation.

Note that, in (b) of FIG. 7, the input gradation agrees with the target gradation (estimated attained gradation), but in (b) of FIG. 8, the input gradation is different from the target gradation (estimated attained gradation).

In the case of a key frame, in a case where, for example, the start gradation is 64 and the input gradation is 128, the target gradation (estimated attained gradation) is set to 128 (just setting), as shown in (a) of FIG. 7. Accordingly, an emphasized gradation (output gradation) of post-gradation conversion data in the current frame is set to 140 with reference to the first LUT shown in (b) of FIG. 7.

Meanwhile, in the case of an interpolation frame, in a case where, for example, the start gradation is 64 and the input gradation is 128, the target gradation (estimated attained gradation) is set to 144 (strong setting), as shown in (a) of FIG. 8. Accordingly, an emphasized gradation (output gradation) of post-gradation conversion data in the current frame is set to 159 with reference to the second LUT shown in (b) of FIG. 8. Note that an attained gradation (display gradation) attained after the overshooting (next frame) is 144 as shown in FIG. 9.

As shown in (a) of FIG. 8, in a normally black liquid crystal mode, especially a VA mode, response of liquid crystals is generally slow in the case of rise response (dark→bright) than decay response (bright→dark), and visual sensitivity of human to a change rate of luminance differs between the rise response and the decay response. Accordingly, in the present invention, it is preferable that tone transition in the rise response side is made strong and tone transition in the decay response is made relatively weak. In the present embodiment, within a range in which response is sufficient, the luminance level is emphasized by 140% at the rise response side, and the luminance level is emphasized by 105% at the decay response side.

As described above, it is preferable that "estimated attained gradation" is obtained by converting a luminance calculated by the equation into a gradation value. This is because a relationship between a gradation and a luminance may be arbitrarily changed depending on design and application of a display device, and it is therefore difficult to design an emphasis level that is always suitable at a gradation level, whereas a suitable emphasis level hardly changes at a luminance level. Of course, since how luminance and gradation are set can be known from design of a display device, such an arrangement is possible in which a table in which luminance is converted again into gradation is prepared in advance. This is preferable also from the viewpoint of saving of a circuit scale. In a general display device, gradation and luminance show a smooth correlation, and therefore, in many cases, the effects of the present invention can be obtained even if an emphasis level is determined on the basis of a gradation level instead of a luminance level.

As described above, in the present embodiment, as for a key frame, an emphasis level of tone transition is set so that an attained gradation approaches a target gradation (just setting), as in the conventional overshooting drive. Meanwhile, as for an interpolation frame generated according to the second generation mode, an emphasis level of tone transition is set so that an attained gradation exceeds a target gradation (strong setting). Thus, the luminance is changed more rapidly. In the above example, an estimated attained luminance is set so that an attained luminance becomes larger than a target luminance by 40%, but the emphasis level is not limited to 40%. Specifically, the emphasis level is preferably in the range from 25% to 40%. In a case where the emphasis level is below 25%, the response improvement effect cannot be sufficiently obtained. Meanwhile, in a case where the emphasis level is larger than 40%, a pattern of fluctuation of luminance may occur in an intermediate frame. Consequently, flicker may be observed. In a case where the emphasis level is set to a value larger than 40%, it is preferable that a refresh rate is set to 150 Hz or more. This can suppress occurrence of flicker.

The following briefly describes viewability of flicker. Whether flicker is observed or not largely depends on contrast and frequency of the flicker. In the movie era, it was thought that flicker cannot be observed at 24 Hz, but as luminance and contrast of television become higher in recent years, it is revealed that flicker can be observed at 60 Hz or more, and can be observed up to approximately 70 Hz by a person having good eyesight. It is known that flicker that occurs in the present invention has a frequency half the refresh rate. Accordingly, in a case where the refresh rate is 75 Hz×2=150 Hz, the display device can be used without concern for flicker. Therefore, the present invention is more suitably used in a display device that is driven at a frequency three times or four times 50 Hz or at a frequency three times or four times 60 Hz. Of course, the present invention can be used in a display device which employs a double-speed mode by appropriately adjusting the emphasis level so that flicker becomes unnoticeable.

In the present embodiment, a gradation value of post-gradation conversion data is found with reference to an LUT (the first LUT or the second LUT). However, the present invention is not limited to this. A gradation value of post-gradation conversion data can be found by a known technique such as a method using computation or a method using learning. However, these methods cause an increase in circuit scale, and it is therefore preferable that plural kinds of LUTs are used as in the present embodiment. Although every combination of gradations (256×256 in the case of 8 bit) can be set in an LUT, it is preferable, in consideration of accuracy and circuit scale, that a change amount is defined for every 32 gradations or 16 gradations out of 256 gradations, and the other combinations are found by computation.

The operation of setting the emphasized gradation (output gradation) of post-gradation conversion data is an operation which is carried out in a case where a motion vector cannot be calculated, and no interpolation frame corresponding to the motion vector is generated, and instead an interpolation frame having an intermediate gradation is generated (second generation mode). Meanwhile, in a case where the interpolation frame generation section 52 properly calculates a motion vector and generates an interpolation frame in accordance with the motion vector thus calculated (first generation mode), an emphasized gradation (output gradation) of post-gradation conversion data is set as follows.

Specifically, the above setting method for a key frame is employed. The overshooting section 53 sets an emphasized gradation (output gradation) of post-gradation conversion data with reference to the first LUT (see (b) of FIG. 7) (just setting) regardless of a type of a current frame (a key frame or an interpolation frame) acquired from the interpolation frame generation section 52.

The following describes an operation flow of the overshooting section 53 of the present embodiment. FIG. 10 is a flow chart showing an operation of the overshooting section 53.

First, in Step 1, the overshooting section 53 acquires, from the interpolation frame generation section 52, image data (key frame, interpolation frame) whose frame rate has been converted. The image data is given a flag for identifying a generation mode and a flag for identifying a type of the frame.

In Step 2, the determining section 530 of the overshooting section 53 determines whether the image data thus acquired is "key frame" or "interpolation frame". Specifically, the determining section 530 determined whether the image data is an interpolation frame or not.

In a case where the image data thus acquired is an interpolation frame (YES in Step 2), the process in Step 3 is carried out in which the determining section 530 determines whether the image data is image data generated according to "first generation mode" or image data generated according to "second generation mode". Specifically, the determining section 530 determines whether the image data is image data generated according to the second generation mode or not.

In a case where the image data is image data generated according to the second generation mode (YES in Step 3), the process in Step 4 is carried out in which the gradation conversion section 532 calculates an estimated attained luminance according to the strong setting. Here, an estimated attained luminance is calculated by using the above equation.

Then, the gradation conversion section 532 determines an output gradation with reference to the second LUT (see (b) of FIG. 8) on the basis of an estimated attained gradation corresponding to the estimated attained luminance calculated in Step 4 and a display gradation (start gradation) of an immediately preceding frame (Step 5).

Meanwhile, in a case where the image data is not an interpolation frame (a case where the image data is a key frame) (NO in Step 2), the process in Step 6 is carried out in which an estimated attained luminance is calculated according to the just setting (Step 6). That is, the estimated attained luminance is set so that an estimated attained gradation agrees with a target gradation. Then, an output gradation is determined with reference to the first LUT (see (b) of FIG. 7) on the basis of an estimated attained gradation corresponding to the estimated attained luminance thus calculated and a display gradation (start gradation) of an immediately preceding frame (Step 7).

In a case where the image data is an interpolation frame (YES in Step 2) but is not image data generated according to the second generation mode (image data generated according to the first generation mode) (NO in Step 3), the process in Step 6 is carried out in which an estimated attained luminance is calculated according to the just setting (Step 6). That is, the estimated attained luminance is set so that an estimated attained gradation agrees with a target gradation. Then, an output gradation is determined with reference to the first LUT on the basis of an estimated attained gradation corresponding to the estimated attained luminance thus calculated and a display gradation (start gradation) of an immediately preceding frame (Step 7).

The above description has dealt with an arrangement in which (i) an estimated attained luminance (gradation) according to the strong setting or the just setting is calculated on the basis of flags given to image data, and (ii) an output gradation is determined with reference to the first LUT or the second LUT on the basis of the estimated attained gradation. However, the present embodiment is not limited to this, and the following arrangement is also possible. For example, estimated attained gradations according to the strong setting and the just setting are calculated in advance (see (a) of FIG. 8), and output gradations are calculated in advance on the basis of the estimated attained gradations thus calculated. Thus, an output gradation of a current frame is determined with reference to an LUT (see FIG. 12) in which the output gradation thus calculated, a display gradation (start gradation) of an immediately preceding frame, and an input gradation of the current frame are associated with each other. That is, the output gradation is determined on the basis of the start gradation and the input gradation. According to this arrangement, it is possible to omit the processes in Step 4 and Step 6 of FIG. 10.

Embodiment 2

Embodiment 2 of the present invention is described below with reference to the drawings. For convenience of description, members that have identical functions to those in Embodiment 1 are given identical reference numerals, and are not explained repeatedly. Further, the terms defined in Embodiment 1 are used according to the same definition also in the present embodiment unless otherwise specified.

FIG. 11 is a block diagram illustrating an overall configuration of a liquid crystal display device 2 of the present Embodiment 2. The liquid crystal display device 2 of the present Embodiment 2 is different from the liquid crystal display device 1 of Embodiment 1 in that the interpolation frame generation section 52 does not output the generation mode identification signal. Accordingly, in the present liquid crystal display device 2, overshooting is carried out according to the strong setting with respect to an interpolation frame regardless of whether the interpolation frame is generated according to the first generation mode or the second generation mode.

As for the frame identification signal for distinguishing between a key frame and an interpolation frame, it is only necessary to identify a target frame for every 1/240 seconds in the case of quad-speed drive. Accordingly, the frame identification signal hardly affects a circuit scale. However, as for the generation mode identification signal for distinguishing between the first generation mode and the second generation mode, judgment is necessary for each pixel. This increases a flag data transfer load on the overshooting section 53, thereby resulting in an increase in circuit scale and increase in cost depending on a product form in which the present invention is realized. Therefore, according to the present Embodiment 2, it is possible to reduce a size and cost of a liquid crystal display device.

Many publicly known methods can be employed for the interpolation frame generation section 52, and in fact, many kinds of LSI realizing this are sold. However, not all of the existing publicly-known frame interpolation circuits (FRC circuits) have a function suitable for the present invention, i.e., a function of identifying a generation mode. Even if such a publicly-known frame interpolation circuit has this function, it does not necessarily have a function of storing flag data for each pixel and outputting image data along with the flag data.

Meanwhile, the function of distinguishing between a key frame and an interpolation frame is a general function of a publicly-known frame interpolation circuit. Even if such a publicly-known frame interpolation circuit does not have this function, it is possible to easily distinguish between a key frame and an interpolation frame by judging input/output timing of image data. Further, it is possible to easily distinguish between a key frame and an interpolation frame also by providing, in a subsequent circuit, a 4-cycle frame counter and a switch for controlling a phase.

That is, in the present Embodiment 2, the interpolation frame generation section 52 outputs a frame identification signal, and the overshooting section 53 determines (sets), on the basis of the frame identification signal, image data (post-gradation conversion data, output gradation) of an overshooting period in a current frame. Note that a circuit (frame identification circuit) for distinguishing between a key frame and an interpolation frame may be provided separately from the interpolation frame generation section 52.

In the present liquid crystal display device 2, an estimated attained gradation is calculated in advance according to the just setting and the strong setting (see (a) of FIG. 7 and (a) of FIG. 8), and an output gradation is calculated in advance on the basis of the estimated attained gradation thus calculated. Then, an output gradation of a current frame is determined with reference to a first' LUT (see (b) of FIG. 7) and a second' LUT (see FIG. 12) in which the output gradation thus calculated, a display gradation (start gradation) of an immediately preceding frame, and an input gradation of a current frame are associated with each other. That is, the output gradation is determined on the basis of the start gradation and the input gradation.

The following describes an operation flow of the overshooting section 53 of the present Embodiment 2. FIG. 13 is a flow chart showing an operation of the overshooting section 53.

First, in Step 11, the overshooting section 53 acquires, from the interpolation frame generation section 52, image data (key frame, interpolation frame) whose frame rate has been converted. The image data is given a flag for identifying a type of the frame.

In Step 12, the determining section 530 of the overshooting section 53 determines whether the image data thus acquired is "key frame" or "interpolation frame". Specifically, the determining section 530 determines whether the image data is an interpolation frame or not.

In a case where the image data thus acquired is an interpolation frame (YES in Step 12), the process in Step 13 is carried out in which the gradation conversion section 532 determines an output gradation according to the strong setting. Here, the output gradation is determined with reference to the second' LUT (see FIG. 12) on the basis of an input gradation and a display gradation (start gradation) of an immediately preceding frame (Step 13).

Meanwhile, in a case where the image data thus acquired is not an interpolation frame (a case where the image data is a key frame) (NO in Step 12), the process in Step 14 is carried out in which the gradation conversion section 532 determines an output gradation according to the just setting. Here, the output gradation is determined with reference to the first' LUT (see (b) of FIG. 7) on the basis of an input gradation and a display gradation (start gradation) of an immediately preceding frame (Step 14).

As described above, according to the above operation, LUTs according to input gradations are set in advance. This simplifies an arrangement as compared with the liquid crystal display device 1 of Embodiment 1. Note that since OS processing of a strong level is applied to an entire area of an image, it is more important to reset response in a key frame. Accordingly, it is preferable that the overshooting section 53 refers to estimated attained gradation tables (see (a) of FIG. 7 and (a) of FIG. 8) corresponding to the respective LUTs, and sets this gradation as a display gradation (start gradation) of an immediately preceding frame.

The following describes effects obtained by the arrangement of the liquid crystal display device 2 of present Embodiment 2. Needless to say, according to the arrangement of the present liquid crystal display device 2, response speed can be improved in a case where the interpolation frame generation section 52 generates an interpolation frame having an intermediate gradation (second generation mode), as in the liquid crystal display device 1 of Embodiment 1. In addition, in the first generation mode, in which the just setting is used in Embodiment 1, the arrangement of the present Embodiment 2 (strong setting) can be effectively utilized. This is described below with reference to specific examples.

FIG. 14 shows images of first and second frames (key frames), and shows a state in which a dark gray box displayed on a left side in the first frame is moved to a right side in the second frame. In the first and second frames, a background is light gray. Unlike the images shown in FIG. 19, a travel distance is small as compared with a size of the displayed object (box). It is therefore relatively easy to identify the object, thereby making it easy to recognize a motion vector. That is, the first generation mode dominantly functions. As a result, three display patterns (interpolation frames) are generated as illustrated in FIG. 15. In Embodiment 1, the just setting is applied in such a case, and the result as shown by the display patterns of FIG. 15 is obtained since it is determined that the interpolation frames are generated according to the first generation mode. However, in the present Embodiment 2, the interpolation frames are displayed as illustrated in FIG. 16 since the strong setting is applied regardless of whether the interpolation frames are generated according to the first generation mode or the second generation mode.

Specifically, in FIG. 16, as to the left-end edge, a displayed object is sequentially removed, and the background gradually becomes visible. Here, the interpolation frame (1) becomes brighter due to the strong setting. This state (display gradation) is stored, as a display gradation (start gradation of a current frame) of a preceding frame, in the OS frame memory 535. In the interpolation frame (2), stronger setting than the interpolation frame (1) is performed. This darkens the brightened portion in the interpolation frame (1) and brightens a portion which is a part of the object in the interpolation frame (1). Similarly, in the interpolation frame (3), a striped edge made up of a bright portion, a dark portion, and a bright portion is displayed in a manner such that the bright and dark portions in the interpolation frame (2) move rightwards.

Similarly, as to the right-end edge, the background turns into the object in the interpolation frame (1), and subsequently, bright and dark states are alternated in the right end every time an interpolation frame is changed to another one.

Since the just setting is applied in key frames (the first frame and the second frame), both of the left-end and right-end edges are reset to normal display. That is, this state is summarized as follows:

(1) Still image part: part which always remains the same since the overshooting is not carried out with respect to this part (2) Part in which an interpolation frame having an intermediate gradation is generated: part in which response speed improves due to the strong setting (3) Part (basically, edge parts of the object) in which an interpolation frame corresponding to a motion vector is generated: part which alternately becomes bright and dark, and shifts to a still state As described above, in a moving image part having an edge, an impulse mode (black luminance insertion mode) is applied instead of the frame interpolation. This improves moving image performance. Since the impulse mode is not applied to the still image part, a problem that maximum luminance declines as compared to normal black insertion does not arise. Further, in a case where the refresh rate is 150 Hz (three times as high as 50 Hz) or more, an impulse frequency of the edge is 75 Hz or more, and therefore is not observed as flicker. That is, in the present Embodiment 2, the present invention is preferably combined with a more than triple-speed frame interpolation technique, more preferably a more than quad-speed frame interpolation technique. Further, the flicker level rapidly attenuates every time the frame is changed to another one. Even if the emphasis level is 50%, an error after three fields is 0.5×0.5×0.5=12.5%. This prevents tailing and tailing light caused by the OS processing of the strong level from being observed in combination with the reset in the key frames.

As described above, in the liquid crystal display device 2 of the present Embodiment 2, the operation of identifying a generation mode that is carried out in the liquid crystal display device 1 of Embodiment 1 is omitted. This increases flexibility of designing the interpolation frame generation section 52. Further, it becomes easy to apply the present invention to a publicly known frame interpolation circuit (FRC circuit).

A liquid crystal display device of the present invention may be configured as described in (1) through (33) below.

(1)

An input image is converted into a refresh rate of at least 150 Hz by an interpolation frame generation section (FRC circuit).

The interpolation frame generation section partially generates, between frames (key frames) corresponding to original images, at least an interpolation frame having a gradation which is intermediate between gradations of the key frames, and supplies the interpolation frame thus generated to an overshooting section (OS circuit).

The overshooting section includes an OS frame memory. The overshooting section causes the OS frame memory to record a current frame, and outputs a previous frame in synchronization with the current frame. Then, the overshooting section compares the previous frame and the current frame, and makes a correction so that tone transition enlarges.

The frame interpolation circuit gives the overshooting section information indicating whether the generated frame is a key frame or an interpolation frame.

The overshooting section changes a conversion level (emphasis level, correction level) of tone transition on the basis of the frame identification information (information indicating whether the generated frame is, a key frame or an interpolation frame).

Note that, according to the arrangement of the present invention, in an area in which tone transition is large (e.g., edge area), there is a possibility that a gradation bounces so that too strong OS is corrected. In a case where a screen is adjusted to have the same luminance on average, this portion is undesirably observed as flicker. In the case of a bright display device such as a television, flicker is hardly observed at 75 Hz or more, and therefore the refresh rate is preferably 150 Hz or more. That is, the present invention is applicable to a display device driven at a frequency that is triple the frequency of a PAL signal (50 Hz), more preferably a display device driven at a frequency that is four times the frequency of a NTSC 60 Hz signal.

A large number of logics for the overshooting section (OS circuit) and the interpolation frame generation section (FRC circuit) are publicly known, and any of these logics may be used. Main features of the present invention lie in that the FRC circuit identifies a frame (a key frame or an interpolation frame) and that the OS circuit sets different OS level for respective fields by using a control signal.

(2)

The OS circuit preferably has at least two types of correction level. One of the at least two types of correction level is a correction level A (strong setting), and the other one is a correction level B (just setting). The correction level A is larger in correction amount (tone transition amount) than the correction level B regardless of a combination of the tone transition.

The present invention accelerates response in an intermediate gradation region. Accordingly, it is preferable that the correction amount depends only on the frame identification and that the one OS level does not go below the other one in all the tone transition cases. This is because, in a case where the settings are mixed, a color varies depending on a field when an intermediate color transition occurs in which relatively weak tone transition and relatively strong tone transition are combined.

(3)

It is preferable that the OS circuit corrects (emphasizes) a current frame gradation on the basis of a previous attained luminance level of a liquid crystal pixel in accordance with a correction level, and causes the corrected gradation to be stored in a frame memory as a next previous frame gradation (determines the corrected gradation as an attained gradation).

In the present invention, it is preferable that a state is reset to a state corresponding to an input image for every key frame. Especially in a case where response speed itself of liquid crystals becomes relatively slow due to a low environmental temperature and a large refresh rate, so that discrepancy between a target gradation and an attained gradation constantly occurs, reset may be incorrectly carried out. In a state in which the response speed of the liquid crystals is relatively sufficiently fast, a target gradation can be attained easily regardless of a start gradation. Accordingly, it is of course possible that this mechanism is not included. Whether this mechanism is included or not is appropriately selected depending on a usage environment and objective of the display device.

(4)

It is preferable that the FRC circuit outputs at least a frame identification signal for distinguishing between a key frame and an interpolation frame.

An accurate and easy way to make a conversion level of tone transition for a key frame different from a conversion level of tone transition for an interpolation frame is to cause the FRC circuit which generates an interpolation frame to output a frame identification signal. In an arrangement in which the FRC circuit does not output the frame identification signal, an arrangement in which a frame counter which is synchronized with an input signal is separately provided is necessary. This may cause an increase in possibility of incorrect judgment and an increase in circuit cost.

(5)

It is preferable that the OS circuit selects a correction level in accordance with the frame identification signal.

Similarly, in order to obtain the effect of the present invention without the use of the frame identification signal, it is necessary to provide a field counter mechanism in the OS circuit and to make appropriate selection by using timing adjustment. This may cause an increase in possibility of incorrect judgment and an increase in circuit cost.

(6)

It is preferable that the OS circuit selects the correction level B in a key frame and selects the correction level A in an interpolation frame.

In view of a principle arrangement for obtaining the effect of the present invention, an almost similar effect can be obtained even in a case where a frame in which response is reset is not a key frame but an interpolation frame. However, unlike the key frame, in the interpolation frame, an incorrect image may be outputted due to limitation of FRC circuit performance. Accordingly, it is undesirable, from the viewpoint of image quality, that this is adopted as a standard.

(7)

It is preferable that $k(B) \leq 1$ is satisfied in the correction level B in a case where an estimated attained gradation (luminance) is expressed by the following equation:

estimated attained gradation (luminance)=attained gradation (luminance) of preceding frame+$k$×(input gradation (luminance) of current frame−attained gradation (luminance) of preceding frame).

Since the key frame is for resetting, the strong setting should not be applied to the key frame. It is more preferable that k(B)=1 (just setting) is satisfied. It is preferable that k(B) is set to be smaller than 1 but as close as 1 within a range which does not affect liquid crystal panel performance.

(8)

It is preferable that a correction level k(A) satisfies k(B)<k(A)≤2 in an estimated attained gradation (luminance) corresponding to the correction level A. In a case where k(A) is smaller than k(B), the response improvement effect cannot be obtained. In a case where k(A) is larger than 2, the estimated attained gradation may exceed a final target gradation in the key frame. In a case where an intermediate color having a combination which exceeds the target gradation of the key frame is displayed, an originally impossible complementary color appears. Therefore, such a case is often not permitted from the viewpoint of image quality. Further, in a case where the extent of exceeding the target gradation of the key frame increases, a gradation cannot be sufficiently corrected at the time of resetting. This may cause an edge problem such as a double contour.

(9)

It is preferable that the correction level k(A) satisfies 0.8≤k(B)≤k(A)≤1.5 in an estimated attained gradation (luminance) corresponding to the correction level A. In a case where the correction level k(A) satisfies this relationship, it is possible to obtain effects such as a reset effect, a response improvement effect, an effect of avoiding a complimentary color bad effect, and an effect of preventing contouring.

(10)

It is preferable that the FRC circuit generates at least two interpolation frames, and outputs a frame identification signal which makes it possible to identify all the frames including a key frame.

Further consideration on a liquid crystal response curve reveals that all the interpolation frames are not equal. By identifying all the interpolation frames, it is possible to reduce a change amount (tone transition amount) immediately after or before a key frame. This makes it possible to compress an intermediate gradation transition time, thereby producing an improved response improvement effect.

(11)

It is preferable that the OS circuit has a third correction level C, which satisfies k(C)≤k(B), and that the correction level B is selected in a key frame, the correction level C is selected in an initial interpolation frame, and the correction level A is selected in the other interpolation frames.

By setting the initial interpolation frame so that the liquid crystals hardly respond, a response time can be compressed as a whole. Currently, a liquid crystal mode that is most frequently used is a vertical alignment oblique electric field mode, but this mode has a characteristic that rising from the gradation 0 is very slow. In a case where response in this gradation region is accelerated by OS driving, wave height turbulence may occur depending on a situation (voltage, temperature), and thereby control may be lost. Meanwhile, according to the above arrangement, driving for merely escaping from such a gradation is carried out, and after an appropriate time, the response is accelerated, so that good response characteristic can be obtained.

(12)

It is preferable that the correction level C satisfies 1/16≤k(C)≤4/16 at the luminance level. Note that the correction level C may fall in a range from 0.5% to 1% at the luminance level. In this case, no response occurs, and halfway response is hardly observed.

(13)

It is preferable that a correction level is provided by an LUT and that the OS circuit changes a table to be used on the basis of a table selection signal. As a method of setting the OS level, there are several methods such as a method using computation and a method using learning, in addition to the method using LUTs. However, since there is no model which properly judges an arrangement other than the just setting in accordance with a situation, it is preferable that the correction level is determined in advance for each table.

(14)

The present invention may further include a temperature sensor so that the table selection signal is changed depending on temperature. Temperature dependency of a response characteristic of liquid crystals is very large, and relationship between set values of the correction level A and the correction level B changes at the gradation level as the temperature changes. Accordingly, correction which does not use tables corresponding to respective temperatures is not accurate. This function is not necessary in a case where a liquid crystal display device is always used in a stable environment, but a liquid crystal display device is generally used in various temperature ranges. In view of this, it is preferable to prepare approximately 1 to 16 tables for every 3° C. Note that the number of tables is appropriately selected depending on an environment in which the liquid crystal display device is installed.

(15)

Such an arrangement is also possible in which the table selection signal is changed in accordance with a refresh rate of image data outputted by the FRC circuit. Even in the same liquid crystal display panel, in a case where a time required for response varies, the just setting and the strong setting also change. Accordingly, it is preferable that an appropriate table is selected in accordance with driving conditions of the liquid crystal display panel.

(16)

It is preferable that the OS circuit sets a correction level in all the frames to the correction level B in a case where temperature is lower than a predetermined threshold value. In a case where temperature declines below a certain level, it becomes impossible to attain a target gradation within a field time in many combinations of tone transition. In this case, it is naturally impossible to obtain the response improvement effect. Moreover, a color change and a double contour may occur in the limited number of combinations with a gradation for which response is achieved in time. Accordingly, response in an intermediate gradation region should not be accelerated.

(17)

It is preferable that the OS circuit sets a correction level in all the frames to the correction level B in a case where a refresh rate of image data outputted by the FRC circuit is smaller than 150 Hz. In a case where the refresh rate of image data outputted by the FRC circuit is 150 Hz or larger, an effect of suppressing video troubles such as flicker is large.

(18)

It is preferable that the OS circuit sets a correction level in all the frames to the correction level B in a case where a refresh rate of image data inputted to the FRC circuit is 30 Hz or smaller. For example, as to video such as a movie (24 Hz), video processing, camera effect, and the like are set on the premise that it is watched at this refresh rate. Accordingly, even if the FRC circuit is capable of outputting the refresh rate (240 Hz) 10 times this refresh rate, this effect should be prohibited, and it is preferable that a mechanism for prohibiting this effect be provided so that a viewer's preference is reflected.

(19)

Such an arrangement is also possible in which the FRC circuit has a duplication mode of generating an interpolation frame as a copy of a key frame, and in a case where the duplication mode is selected, the OS circuit sets a correction level in all the frames to the correction level B. Although currently available FRC circuits have wide variety of performance, some of the FRC circuits have a mode of copying an image so as to merely increase the refresh rate for the purpose of merely preventing flicker or for the entertainment purpose (e.g., game). The present invention does not function effectively (no intermediate gradation is generated) for such a video mode, and there is a risk of generating an incorrect display image. Accordingly, it is preferable that this mode is prohibited or a mechanism for prohibiting this mode is provided.

(20)

Such an arrangement is also possible in which the duplication mode is selected in a case where a 3D image (an image for a right eye and an image for a left eye are alternately displayed per field) is inputted to the FRC circuit. In recent years, it is increasingly becoming popular to provide a 3D image content. In such a 3D image, no practical signal correlation is observed between images of respective fields. Accordingly, it is preferable that no interpolation frame is generated in the case of a 3D image.

(21)

It is preferable that the present liquid crystal display device is normally black. In a response improving technique, it is easier to control a voltage from a low voltage state to a high voltage state. In the case of controlling a voltage from a high voltage state to a low voltage state, it is often difficult to improve response due to characteristics of a liquid crystal material. Further, it is known that moving image troubles caused by insufficient response are overwhelmingly greater in a case where black remains than a case where white remains. Accordingly, the effect of the present invention can be attained more effectively in a case where a normally black mode is adopted.

(22)

The present liquid crystal display panel may be arranged such that liquid crystals having negative dielectric anisotropy are vertically aligned, and a tilt direction is divided into four directions or eight directions in each sub-pixel. A technique of dividing a pixel for the purpose of improving a viewing angle is widely known, and can be applied also in the present invention without any problems.

(23)

Such an arrangement is possible in which upper and lower pixel electrodes each are a substantially rectangular pattern and have at least one notch extending from an edge part. This makes it possible to generate an oblique electric field.

(24)

Such an arrangement is possible in which upper and lower pixel electrodes each have at least one cutout (opening).

(25)

An oblique electric field mode has a tendency such that rising from a zero voltage state (black) is very slow. This tendency becomes more remarkable especially as a panel temperature declines. As a result, there are cases where sufficient acceleration cannot be attained. Accordingly, by preparing three stages of OS level and positively suppressing response in an interpolation frame 1, entire response can be dramatically improved.

(26)

It is preferable that at least one of an active matrix substrate and a substrate facing the active matrix substrate is subjected to rubbing treatment according to a tilt direction of liquid crystals.

(27)

It is preferable that an optical alignment film is applied to at least one of an active matrix substrate and a substrate facing the active matrix substrate and that the optical alignment film is subjected to alignment treatment according to a tilt direction. According to this dividing method, response from black is not bad, and therefore an arrangement using two stages of correction level is more effective.

(28)

It is preferable that a negative wave plate is disposed on one side or both sides of a liquid crystal cell so as to be outside the liquid crystal cell. This makes it possible to improve a viewing angle.

(29)

It is preferable that a biaxial wave plate is disposed on one side or both sides of a liquid crystal cell so as to be outside the liquid crystal cell. This makes it possible to improve a viewing angle.

(30)

Such an arrangement is also possible in which (i) a pixel electrode is divided into two sub-pixels, (ii) a TFT is connected to each of the two-sub pixels, (iii) each of the two-sub pixels is connected to an identical data signal line and an identical scanning signal line, (iv) drains of the two-sub pixels are connected, via respective capacitors, to different retention capacitor electrodes in which an electric potential changes on a time axis, and (v) one of the two-sub pixels is always brighter than the other one.

FIG. 17 is a circuit diagram illustrating this arrangement. As illustrated in FIG. 17, as to a pixel P101, the present liquid crystal display device includes a data signal line 11, a scanning signal line 12, a first transistor 13a and a second transistor 13b each of which is connected to the data signal line 11 and the scanning signal line 12, a first retention capacitor wiring CS1 and a second retention capacitor wiring CS2, and a first pixel electrode a and a second pixel electrode b each of which is formed in a region of the pixel P101. The first pixel electrode a is connected to the data signal line 11 via the first transistor 13a, and forms a retention capacitor Cha with the first retention capacitor wiring CS1. The second pixel electrode b is connected to the data signal line 11 via the second transistor 13b, and forms a retention capacitor Chb with the second retention capacitor wiring CS2.

According to the arrangement, pixel potentials of respective pixel electrodes disposed in a single pixel region can be made different from each other by adjusting an electric potential of a CS signal (retention capacitor wiring signal). This makes it possible to improve a viewing angle. Further, according to this arrangement, a minute voltage is surely applied during black display due to an effect of a retention capacitor electrode. This makes it possible to improve response from black as compared with an MVA mode which does not employ this arrangement. Accordingly, response control is easier when the present invention is combined with this arrangement. In FIG. 17, two retention capacitor wirings are disposed in 1 pixel region, but the number of retention capacitor wirings disposed in 1 pixel region is not limited to two, and can be two or more (i.e., CS1, CS2, . . . , CSn−1, and CSn (n is an integer of 2 or more)). It is preferable that 2 to 16 retention capacitor wirings are disposed in 1 pixel region.

(31)

Such an arrangement is also possible in which (i) a single pixel is divided into two sub-pixels, (ii) pixel electrodes formed in the respective sub-pixels are connected, via different TFTs, to an identical scanning signal line and to different data signal lines, and (iii) one of the two sub-pixels is always brighter than the other one.

That is, the present liquid crystal display device may be arranged to include a first and second data signal lines, a scanning signal line, a first transistor connected to the first data signal line and the scanning signal line, a second transistor connected to the second data signal line and the scanning signal line, and first and second pixel electrodes that are formed in 1 pixel region. The first pixel electrode is connected to the first data signal line via the first transistor, and the second pixel electrode is connected to the second data signal line via the second transistor.

FIG. 18 is a circuit diagram illustrating this arrangement. According to the arrangement, pixel potentials of respective pixel electrodes formed in 1 pixel region can be made different from each other by adjusting a data signal electric potential to be supplied to the first and second data signal lines. This makes it possible to improve a viewing angle. According to the arrangement, independent two types of combinations of gradations are determined for an input gradation. It is preferable that a circuit which determines the gradation combinations is disposed between the FRC circuit and the OS circuit. Consequently, two systems of OS circuit are provided.

(32)

It is preferable that response in one of the sub-pixels is controlled according to a different OS level from the other one. In the present liquid crystal display panel, a luminance balance in each of the sub-pixels is not controlled at a constant ratio. Accordingly, in a case where the same strong setting is applied to the sub-pixels, there are cases where an intended luminance cannot be obtained in each pixel.

(33)

It is preferable that the sub-pixels in each frame are almost same in luminance ratio which is a ratio of an attained gradation to an input gradation of a sub-pixel corresponding to the input gradation which ratio is achieved when converted into luminance. That is, it is preferable that a luminance ratio of a sub-pixel corresponding to an input gradation and a luminance ratio of a sub-pixel whose response is being controlled are controlled in a substantially identical manner.

Finally, the blocks of the liquid crystal display device, especially the determining section 530 and the gradation conversion section 532 may be realized by way of hardware or software as executed by a CPU as follows:

The liquid crystal display device include a CPU (central processing unit) and memory devices (memory media). The CPU (central processing unit) executes instructions in control programs realizing the functions. The memory devices include a ROM (read only memory) which contains programs, a RAM (random access memory) to which the programs are loaded, and a memory containing the programs and various data. The objective of the present invention can also be achieved by mounting to the liquid crystal display device a computer-readable storage medium containing control program code (executable program, intermediate code program, or source program) for the liquid crystal display device, which is software realizing the aforementioned functions, in order for the computer (or CPU, MPU) to retrieve and execute the program code contained in the storage medium.

The storage medium may be, for example, a tape, such as a magnetic tape or a cassette tape; a magnetic disk, such as a Floppy (Registered Trademark) disk or a hard disk, or an optical disk, such as CD-ROM/MO/MD/DVD/CD-R; a card, such as an IC card (memory card) or an optical card; or a semiconductor memory, such as a mask ROM/EPROM/EEPROM/flash ROM.

The liquid crystal display device may be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, wired line, such as IEEE 1394, USB, electric power line, cable TV line, telephone line, or ADSL line; or wireless, such as infrared radiation (IrDA, remote control), Bluetooth (Registered Trademark), 802.11 wireless, HDR, mobile telephone network, satellite line, or terrestrial digital network. The present invention encompasses a computer data signal embedded in a carrier wave in which the program code is embodied electronically.

A display driver circuit of the present invention includes: an interpolation frame generation section for generating, on a basis of an image of a previous frame and an image of a subsequent frame, an interpolation frame to be inserted in 1 frame period; and a tone transition emphasis process section for setting an output gradation of a current frame on a basis of an input gradation of the current frame and a display gradation of the previous frame, the display driver circuit driving a liquid crystal display panel so that display corresponding to the output gradation is carried out, the interpolation frame generation section having (i) a first generation mode of generating, on a basis of an image of a key frame corresponding to a video signal, an interpolation frame so that a position of an object is changed with passage of time and (ii) a second generation mode of generating, on a basis of the image of the key frame, an interpolation frame so that a display gradation of the object is changed with passage of time, and the tone transition emphasis process section causing an emphasis level in a tone transition for the interpolation frame generated according to the second generation mode to be different from an emphasis level in a tone transition for the key frame.

According to the arrangement, an emphasis level in tone transition of an interpolation frame having an intermediate gradation can be made different from an emphasis level in tone transition of a key frame. For example, an emphasis level in tone transition of an interpolation frame having an intermediate gradation can be made larger than an emphasis level in tone transition of a key frame. This allows an output gradation of the interpolation frame having the intermediate gradation to be larger than that in a conventional arrangement. Consequently, response speed can be improved (see FIG. 6).

The display driver circuit may be arranged such that the tone transition emphasis process means causes the emphasis level in the tone transition for the interpolation frame generated according to the second generation mode to be larger than the emphasis level in the tone transition for the key frame.

The display driver circuit may be arranged such that the tone transition emphasis process means includes gradation calculating means for calculating an estimated attained gradation which is expected to be attained after the display corresponding to the output gradation is carried out, the gradation calculating means calculates, on a basis of a display gradation of an immediately preceding key frame or a display gradation of an immediately preceding interpolation frame, an estimated attained gradation for the interpolation frame generated according to the second generation mode, and the tone transition emphasis process means determines, on a basis of the estimated attained gradation, an output gradation for the interpolation frame generated according to the second generation mode.

The display driver circuit may be arranged such that the interpolation frame generation means outputs (i) a generation mode identification signal for distinguishing between the first generation mode and the second generation mode and (ii) a frame identification signal for distinguishing between the key frame and the interpolation frame, and the tone transition emphasis process means causes, on a basis of the generation mode identification signal and the frame identification signal acquired from the interpolation frame generation means, the emphasis level in the tone transition for the interpolation frame generated according to the second generation mode to be different from the emphasis level in the tone transition for the key frame.

The display driver circuit may be arranged such that the tone transition emphasis process means determines, on a basis of the frame identification signal, whether a frame acquired from the interpolation frame generation means is the key frame or the interpolation frame, and the tone transition emphasis process means includes determining means for determining, in a case where the frame is the interpolation frame, whether the interpolation frame is an interpolation frame generated according to the first generation mode or an interpolation frame generated according to the second generation mode, on a basis of the generation mode identification signal.

The display driver circuit may be arranged such that the interpolation frame generation means outputs a frame identification signal for distinguishing between the key frame and the interpolation frame, and the tone transition emphasis process means causes, on a basis of the frame identification signal acquired from the interpolation frame generation means, the emphasis level in the tone transition for the interpolation frame to be different from the emphasis level in the tone transition for the key frame.

The display driver circuit may be arranged such that the tone transition emphasis process means includes determining means for determining, on a basis of the frame identification signal, whether a frame acquired from the interpolation frame generation means is the key frame or the interpolation frame.

The display driver circuit may be arranged to further include: a first look-up table in which (i) an input gradation of the key frame, (ii) a display gradation of an immediately preceding key frame or a display gradation of an immediately preceding interpolation frame, and (iii) an output gradation corresponding to the key frame are associated with each other; and a second look-up table in which (i) an input gradation of the interpolation frame, (ii) the display gradation of the immediately preceding key frame or the display gradation of the immediately preceding interpolation frame, (iii) an estimated attained gradation that is expected to be attained after display corresponding to the output gradation in the interpolation frame, and (iv) the output gradation of the interpolation frame are associated with each other, and the tone transition emphasis process means determining the output gradation corresponding to the key frame with reference to the first look-up table, and determining the output gradation corresponding to the interpolation frame generated according to the second generation mode with reference to the second look-up table.

The display driver circuit may be arranged such that the tone transition emphasis process means determines, with reference to the first look-up table, an output gradation corresponding to the interpolation frame generated according to the first generation mode.

The display driver circuit may be arranged to further include: a first look-up table in which (i) an input gradation of the key frame, (ii) a display gradation of an immediately preceding key frame or a display gradation of an immediately preceding interpolation frame, and (iii) an output gradation corresponding to the key frame are associated with each other; and a second look-up table in which (i) an input gradation of the interpolation frame, (ii) the display gradation of the immediately preceding key frame or the display gradation of the immediately preceding interpolation frame, and (iii) an output gradation of the interpolation frame are associated with each other, the tone transition emphasis process means determining the output gradation corresponding to the key frame with reference to the first look-up table, and determining the output gradation corresponding to the interpolation frame with reference to the second look-up table.

The display driver circuit may be arranged such that the estimated attained gradation is expressed by the following formula when converted into luminance:

luminance corresponding to the display gradation of the previous frame+k×(luminance corresponding to the input gradation of the current frame−luminance corresponding to the display gradation of the previous frame)

where k is the emphasis level, and
the following is satisfied:
$k2 < k1$
where k1 is an emphasis level for an estimated attained gradation of the interpolation frame generated according to the second generation mode, and k2 is an emphasis level for an estimated attained gradation of the key frame.

The display driver circuit may be arranged such that the following is satisfied:
$k2 < k1 \leq 2$.

The display driver circuit may be arranged such that the following is satisfied:
$0.8 \leq k2 \leq 1 < k1 \leq 1.5$.

The display driver circuit may be arranged such that the interpolation frame generation means generates at least two interpolation frames and outputs a frame identification signal for distinguishing between the key frame and each of the at least two interpolation frames, the tone transition emphasis process means causes, on a basis of the frame identification signal acquired from the interpolation frame generation means, an emphasis level in a tone transition for each of the at least two interpolation frames to be different from the emphasis level in the tone transition for the key frame.

The display driver circuit may be arranged such that the tone transition emphasis process means includes a frame memory in which the estimated attained gradation is stored as the display gradation of the previous frame.

The display driver circuit may be arranged such that the estimated attained gradation is expressed by the following formula when converted into luminance:

luminance corresponding to the display gradation of the previous frame+k×(luminance corresponding to the input gradation of the current frame−luminance corresponding to the display gradation of the previous frame)

where k is the emphasis level, and
the following is satisfied:
$k3 \leq k2 < k1$
where k3 is an emphasis level for an estimated attained gradation of an interpolation frame immediately following the key frame, k1 is an emphasis level for an estimated attained gradation of another interpolation frame following the interpolation frame, and k2 is an emphasis level for an estimated attained gradation of the key frame.

The display driver circuit may be arranged such that the emphasis level k3 satisfies the following when converted into luminance:

$1/16 \leq k3 \leq 4/16$.

The display driver circuit may be arranged to further include temperature detecting means for detecting temperature around the liquid crystal display panel, the tone transition emphasis process means further causes, in accordance with the temperature, the emphasis level in the tone transition for the interpolation frame generated according to the second generation mode to be different from the emphasis level in the tone transition for the key frame.

The display driver circuit may be arranged such that in a case where a refresh rate of image data supplied to the interpolation frame generation means is 30 Hz or lower or in a case where a refresh rate of image data supplied from the interpolation frame generation means to the tone transition emphasis process means is lower than 150 Hz, an emphasis level for the estimated attained gradation is set to k2 in all frames.

The display driver circuit may be arranged such that the interpolation frame generation means has a duplication mode of generating the interpolation frame by duplicating the key frame, and in the duplication mode, an emphasis level for the estimated attained gradation is set to k2 in all frames.

The display driver circuit may be arranged such that the interpolation frame generation means generates the interpolation frame according to the duplication mode in a case where a 3D image is inputted.

A liquid crystal display device of the present invention includes any of the display driver circuits, and the liquid crystal display panel.

The liquid crystal display device of the present invention may be arranged such that the liquid crystal display device is normally black.

The liquid crystal display device of the present invention may be arranged such that each pixel is divided into a plurality of sub-pixels, and in the liquid crystal display panel, liquid crystals having negative dielectric anisotropy are vertically aligned, and a tilt direction is divided into four directions or eight directions in each of the plurality of sub-pixels.

The liquid crystal display device of the present invention may be arranged such that a pixel electrode of said each pixel has a substantially rectangular shape, and has at least one notch extending from an edge part of the pixel electrode.

The liquid crystal display device of the present invention may be arranged such that the pixel electrode of said each pixel has at least one opening.

The liquid crystal display device of the present invention may be arranged such that at least one of an active matrix substrate and a substrate facing the active matrix substrate is subjected to rubbing treatment according to a tilt direction of liquid crystals.

The liquid crystal display device of the present invention may be arranged such that an optical alignment film is applied to at least one of the active matrix substrate and the substrate facing the active matrix substrate, and the optical alignment film is subjected to alignment treatment according to the tilt direction of the liquid crystals.

The liquid crystal display device of the present invention may be arranged such that a negative wave plate is disposed on at least one of an active matrix substrate and a substrate facing the active matrix substrate.

The liquid crystal display device of the present invention may be arranged such that a biaxial wave plate is disposed on at least one of an active matrix substrate and a substrate facing the active matrix substrate.

The liquid crystal display device of the present invention may be arranged to further include: a data signal line; a scanning signal line; a first transistor and a second transistor each of which is connected to the data signal line and the scanning signal line; a first retention capacitor wiring and a second retention capacitor wiring; and a first pixel electrode and a second pixel electrode that are formed in a single pixel region, the first pixel electrode being connected to the data signal line via the first transistor, and forming a retention capacitor with the first retention capacitor wiring, and the second pixel electrode being connected to the data signal line via the second transistor, and forming a retention capacitor with the second retention capacitor wiring.

The liquid crystal display device of the present invention may be arranged to further include: a first data signal line and a second data signal line; a scanning signal line; a first transistor connected to the first data signal line and the scanning signal line; a second transistor connected to the second data signal line and the scanning signal line; and a first pixel electrode and a second pixel electrode that are formed in a single pixel region, the first pixel electrode being connected to the first data signal line via the first transistor, and the second pixel electrode being connected to the second data signal line via the second transistor.

The liquid crystal display device of the present invention may be arranged such that sub-pixels respectively corresponding to the first pixel electrode and the second pixel electrode are different from each other in emphasis level of an estimated attained gradation which is expected to be attained after display corresponding to the output gradation.

The liquid crystal display device of the present invention may be arranged such that, in each frame, sub-pixels respectively corresponding to the first pixel electrode and the second pixel electrode are substantially same in luminance ratio which is a ratio of an estimated attained gradation to an input gradation achieved when converted into luminance, the estimated attained gradation being a gradation that is expected to be attained after display corresponding to the output gradation.

A display driving method of the present invention includes the steps of: (a) generating, on a basis of an image of a previous and an image of a subsequent frame, an interpolation frame to be inserted in 1 frame period; and (b) setting an output gradation of a current frame on a basis of an input gradation of the current frame and a display gradation of the previous frame, the display driving method being for driving a liquid crystal display panel so that display corresponding to the output gradation is carried out, the step (a) including (i) a first generation mode of generating, on a basis of an image of a key frame corresponding to a video signal, an interpolation frame so that a position of an object is changed with passage of time and (ii) a second generation mode of generating, on a basis of the image of the key frame, an interpolation frame so that a display gradation of the object is changed with passage of time, and in the step (b), an emphasis level in a tone transition for the interpolation frame generated according to the second generation mode being made different from an emphasis level in a tone transition for the key frame.

The driving method produces a similar effect to that produced by the arrangements of the display driver circuit. That is, an output gradation of an interpolation frame having an intermediate gradation can be made larger than a conventional arrangement. Consequently, response speed can be improved.

Note that the display driver circuit may be realized by a computer. In this case, the present invention encompasses (i) a control program for each device which causes the computer to function as each means so that the display driver circuit is realized by the computer and (ii) a computer-readable recording medium in which the control program is stored.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention is suitably applicable especially to driving of an active-matrix type liquid crystal display device.

REFERENCE SIGNS LIST 1, 2: Liquid crystal display device
10: Liquid crystal display panel
11: Data signal line
12: Scanning signal line
13: TFT (switching element)
14: Pixel electrode
15: Retention capacitor wiring
20: Data signal line driving circuit (source driver)
30: Scanning signal line driving circuit (gate driver)
40: Retention capacitor wiring driving circuit (CS driver)
50: Display driver circuit
51: Image processing section
52: Interpolation frame generation section (FRC circuit, interpolation frame generation means)
53: Overshooting section (OS circuit, tone transition emphasis process means)
54: LCD timing controller
55: Image interpolation frame memory
530: Determining section (determining means)
531: Memory managing section
532: Gradation conversion section (gradation calculating means)
533: First LUT (first look-up table)
534: Second LUT (second look-up table)
535: OS frame memory
536: Output section

The invention claimed is:

1. A display driver circuit comprising:
interpolation frame generation means for generating, on a basis of an image of a previous frame and an image of a subsequent frame, an interpolation frame to be inserted in 1 frame period; and
tone transition emphasis process means for setting an output gradation of a current frame on a basis of an input gradation of the current frame and a display gradation of the previous frame,
the display driver circuit driving a liquid crystal display panel so that display corresponding to the output gradation is carried out,
the interpolation frame generation means having (i) a first generation mode of generating, on a basis of an image of a key frame corresponding to a video signal, an interpolation frame so that a position of an object is estimated on a basis of a calculated motion vector and the position of the object is changed with passage of time and (ii) a second generation mode of generating an interpolation frame which is not the interpolation frame based on the calculated motion vector and has an intermediate gradation, the interpolation frame being generated on a basis of the image of the key frame, so that a display gradation of the object is changed with passage of time, and
the tone transition emphasis process means causing an emphasis level in a tone transition for the interpolation frame generated according to the second generation mode to be higher than an emphasis level in a tone transition for the key frame.

2. The display driver circuit according to claim 1, wherein:
the tone transition emphasis process means includes gradation calculating means for calculating an estimated attained gradation which is expected to be attained after the display corresponding to the output gradation is carried out,
the gradation calculating means calculates, on a basis of a display gradation of an immediately preceding key frame or a display gradation of an immediately preceding interpolation frame, an estimated attained gradation for the interpolation frame generated according to the second generation mode, and
the tone transition emphasis process means determines, on a basis of the estimated attained gradation, an output gradation for the interpolation frame generated according to the second generation mode.

3. The display driver circuit according to claim 1, wherein:
the interpolation frame generation means outputs (i) a generation mode identification signal for distinguishing between the first generation mode and the second generation mode and (ii) a frame identification signal for distinguishing between the key frame and the interpolation frame, and
the tone transition emphasis process means causes, on a basis of the generation mode identification signal and the frame identification signal acquired from the interpolation frame generation means, the emphasis level in the tone transition for the interpolation frame generated according to the second generation mode to be higher than the emphasis level in the tone transition for the key frame.

4. The display driver circuit according to claim 3, wherein:
the tone transition emphasis process means determines, on a basis of the frame identification signal, whether a frame acquired from the interpolation frame generation means is the key frame or the interpolation frame, and
the tone transition emphasis process means includes determining means for determining, in a case where the frame is the interpolation frame, whether the interpolation frame is an interpolation frame generated according to the first generation mode or an interpolation frame generated according to the second generation mode, on a basis of the generation mode identification signal.

5. The display driver circuit according to claim 1, wherein:
the interpolation frame generation means outputs a frame identification signal for distinguishing between the key frame and the interpolation frame, and
the tone transition emphasis process means causes, on a basis of the frame identification signal acquired from the interpolation frame generation means, the emphasis level in the tone transition for the interpolation frame to be higher than the emphasis level in the tone transition for the key frame.

6. The display driver circuit according to claim 5, wherein the tone transition emphasis process means includes determining means for determining, on a basis of the frame identification signal, whether a frame acquired from the interpolation frame generation means is the key frame or the interpolation frame.

7. The display driver circuit according to claim 1, further comprising:
a first look-up table in which (i) an input gradation of the key frame, (ii) a display gradation of an immediately preceding key frame or a display gradation of an immediately preceding interpolation frame, and (iii) an output gradation corresponding to the key frame are associated with each other; and
a second look-up table in which (i) an input gradation of the interpolation frame, (ii) the display gradation of the immediately preceding key frame or the display gradation of the immediately preceding interpolation frame, (iii) an estimated attained gradation that is expected to be attained after display corresponding to the output gradation in the interpolation frame, and (iv) the output gradation of the interpolation frame are associated with each other, and
the tone transition emphasis process means determining the output gradation corresponding to the key frame with reference to the first look-up table, and determining the output gradation corresponding to the interpolation frame generated according to the second generation mode with reference to the second look-up table.

8. The display driver circuit according to claim 7, wherein the tone transition emphasis process means determines, with reference to the first look-up table, an output gradation corresponding to the interpolation frame generated according to the first generation mode.

9. The display driver circuit according to claim 1, further comprising:
a first look-up table in which (i) an input gradation of the key frame, (ii) a display gradation of an immediately preceding key frame or a display gradation of an immediately preceding interpolation frame, and (iii) an output gradation corresponding to the key frame are associated with each other; and
a second look-up table in which (i) an input gradation of the interpolation frame, (ii) the display gradation of the immediately preceding key frame or the display gradation of the immediately preceding interpolation frame, and (iii) an output gradation of the interpolation frame are associated with each other,
the tone transition emphasis process means determining the output gradation corresponding to the key frame with reference to the first look-up table, and determining the output gradation corresponding to the interpolation frame with reference to the second look-up table.

10. The display driver circuit according to claim 2, wherein:
the estimated attained gradation is expressed by the following formula when converted into luminance:

luminance corresponding to the display gradation of the previous frame+$k$×(luminance corresponding to the input gradation of the current frame−luminance corresponding to the display gradation of the previous frame)

where k is the emphasis level, and
the following is satisfied:
$k2<k1$
where k1 is an emphasis level for an estimated attained gradation of the interpolation frame generated according to the second generation mode, and k2 is an emphasis level for an estimated attained gradation of the key frame.

11. The display driver circuit according to claim 10, wherein the following is satisfied:
$k2<k1\leq2$.

12. The display driver circuit according to claim 10, wherein the following is satisfied:
$0.85\leq k2\leq1<k1\leq1.5$.

13. The display driver circuit according to claim 1, wherein:
the interpolation frame generation means generates at least two interpolation frames and outputs a frame identification signal for distinguishing between the key frame and each of the at least two interpolation frames,
the tone transition emphasis process means causes, on a basis of the frame identification signal acquired from the interpolation frame generation means, an emphasis level in a tone transition for each of the at least two interpolation frames to be higher than the emphasis level in the tone transition for the key frame.

14. The display driver circuit according to claim 2, wherein the tone transition emphasis process means includes a frame memory in which the estimated attained gradation is stored as the display gradation of the previous frame.

15. The display driver circuit according to claim 2, wherein:
the estimated attained gradation is expressed by the following formula when converted into luminance:

luminance corresponding to the display gradation of the previous frame+$k$×(luminance corresponding to the input gradation of the current frame−luminance corresponding to the display gradation of the previous frame)

where k is the emphasis level, and
the following is satisfied:
$k3\leq k2<k1$
where k3 is an emphasis level for an estimated attained gradation of an interpolation frame immediately following the key frame, k1 is an emphasis level for an estimated attained gradation of another interpolation frame following the interpolation frame, and k2 is an emphasis level for an estimated attained gradation of the key frame.

16. The display driver circuit according to claim 15, wherein: the emphasis level k3 satisfies the following when converted into luminance:
$1/16\leq k3\leq4/16$.

17. The display driver circuit according to claim 1, further comprising temperature detecting means for detecting temperature around the liquid crystal display panel,
the tone transition emphasis process means further causes, in accordance with the temperature, the emphasis level in the tone transition for the interpolation frame generated according to the second generation mode to be higher than the emphasis level in the tone transition for the key frame.

18. The display driver circuit according to claim 10, wherein:
in a case where a refresh rate of image data supplied to the interpolation frame generation means is 30 Hz or lower or in a case where a refresh rate of image data supplied from the interpolation frame generation means to the tone transition emphasis process means is lower than 150 Hz, an emphasis level for the estimated attained gradation is set to k2 in all frames.

19. The display driver circuit according to claim 10, wherein:
the interpolation frame generation means has a duplication mode of generating the interpolation frame by duplicating the key frame, and
in the duplication mode, an emphasis level for the estimated attained gradation is set to k2 in all frames.

20. The display driver circuit according to claim 19, wherein the interpolation frame generation means generates the interpolation frame according to the duplication mode in a case where a 3D image is inputted.

21. A liquid crystal display device comprising:
a display driver circuit as set forth in claim 1; and
the liquid crystal display panel.

22. The liquid crystal display device according to claim 21, wherein the liquid crystal display device is normally black.

23. The liquid crystal display device according to claim 21, wherein:
each pixel is divided into a plurality of sub-pixels, and
in the liquid crystal display panel, liquid crystals having negative dielectric anisotropy are vertically aligned, and a tilt direction is divided into four directions or eight directions in each of the plurality of sub-pixels.

24. The liquid crystal display device according to claim 21, wherein:
a pixel electrode of said each pixel has a substantially rectangular shape, and has at least one notch extending from an edge part of the pixel electrode.

25. The liquid crystal display device according to claim 24, wherein the pixel electrode of said each pixel has at least one opening.

26. The liquid crystal display device according to claim 21, wherein at least one of an active matrix substrate and a substrate facing the active matrix substrate is subjected to rubbing treatment according to a tilt direction of liquid crystals.

27. The liquid crystal display device according to claim 26, wherein:
an optical alignment film is applied to at least one of the active matrix substrate and the substrate facing the active matrix substrate, and
the optical alignment film is subjected to alignment treatment according to the tilt direction of the liquid crystals.

28. The liquid crystal display device according to claim 21, wherein a negative wave plate is disposed on at least one of an active matrix substrate and a substrate facing the active matrix substrate.

29. The liquid crystal display device according to claim 21, wherein a biaxial wave plate is disposed on at least one of an active matrix substrate and a substrate facing the active matrix substrate.

30. The liquid crystal display device according to claim 21, further comprising:
a data signal line;
a scanning signal line;
a first transistor and a second transistor each of which is connected to the data signal line and the scanning signal line;
a first retention capacitor wiring and a second retention capacitor wiring; and
a first pixel electrode and a second pixel electrode that are formed in a single pixel region,
the first pixel electrode being connected to the data signal line via the first transistor, and forming a retention capacitor with the first retention capacitor wiring, and
the second pixel electrode being connected to the data signal line via the second transistor, and forming a retention capacitor with the second retention capacitor wiring.

31. The liquid crystal display device according to claim 21, further comprising:
a first data signal line and a second data signal line;
a scanning signal line;
a first transistor connected to the first data signal line and the scanning signal line;
a second transistor connected to the second data signal line and the scanning signal line; and
a first pixel electrode and a second pixel electrode that are formed in a single pixel region,
the first pixel electrode being connected to the first data signal line via the first transistor, and
the second pixel electrode being connected to the second data signal line via the second transistor.

32. The liquid crystal display device according to claim 31, wherein sub-pixels respectively corresponding to the first pixel electrode and the second pixel electrode are different from each other in emphasis level of an estimated attained gradation which is expected to be attained after display corresponding to the output gradation.

33. The liquid crystal display device according to claim 31, wherein, in each frame, sub-pixels respectively corresponding to the first pixel electrode and the second pixel electrode are substantially same in luminance ratio which is a ratio of an estimated attained gradation to an input gradation achieved when converted into luminance, the estimated attained gradation being a gradation that is expected to be attained after display corresponding to the output gradation.

34. A display driving method comprising the steps of:
(a) generating, on a basis of an image of a previous and an image of a subsequent frame, an interpolation frame to be inserted in 1 frame period; and
(b) setting an output gradation of a current frame on a basis of an input gradation of the current frame and a display gradation of the previous frame,
the display driving method being for driving a liquid crystal display panel so that display corresponding to the output gradation is carried out,
the step (a) including (i) a first generation mode of generating, on a basis of an image of a key frame corresponding to a video signal, an interpolation frame so that a position of an object is estimated on a basis of a calculated motion vector and the position of the object is changed with passage of time and (ii) a second generation mode of generating an interpolation frame which is not the interpolation frame based on the calculated motion vector and has an intermediate gradation, the interpolation frame being generated on a basis of the image of the key frame so that a display gradation of the object is changed with passage of time, and
in the step (b), an emphasis level in a tone transition for the interpolation frame generated according to the second generation mode being made higher than an emphasis level in a tone transition for the key frame.

35. A control program for causing a display driver circuit as set forth in claim 1 to operate, the control program causing a computer to function as the each means of the display driver circuit.

36. A computer-readable recording medium in which the control program as set forth in claim 35 is stored.

* * * * *